United States Patent
Mochizuki et al.

(10) Patent No.: US 9,453,629 B2
(45) Date of Patent: Sep. 27, 2016

(54) LIGHT DISTRIBUTION CONTROL SYSTEM

(71) Applicant: Koito Manufacturing Co., Ltd., Tokyo (JP)

(72) Inventors: Kiyotaka Mochizuki, Shizuoka (JP); Teruaki Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 55 days.

(21) Appl. No.: 14/617,206

(22) Filed: Feb. 9, 2015

(65) Prior Publication Data

US 2015/0241013 A1 Aug. 27, 2015

(30) Foreign Application Priority Data

Feb. 21, 2014 (JP) ................... 2014-031887

(51) Int. Cl.
*F21S 8/10* (2006.01)
*B60Q 1/08* (2006.01)
*B60Q 1/14* (2006.01)

(52) U.S. Cl.
CPC ........... *F21S 48/1721* (2013.01); *B60Q 1/085* (2013.01); *B60Q 1/143* (2013.01); *F21S 48/1742* (2013.01); *F21S 48/1794* (2013.01); *B60Q 2300/056* (2013.01); *B60Q 2300/112* (2013.01); *B60Q 2300/122* (2013.01); *B60Q 2300/42* (2013.01); *F21S 48/1159* (2013.01)

(58) Field of Classification Search
CPC ............. F21S 48/1159; F21S 48/1721; F21S 48/1742; F21S 48/1794; B60Q 1/085; B60Q 1/143; B60Q 2300/056; B60Q 2300/112122; B60Q 2300/42
See application file for complete search history.

(56) References Cited

U.S. PATENT DOCUMENTS

| | | | | |
|---|---|---|---|---|
| 5,645,338 A * | 7/1997 | Kobayashi | ............ | B60Q 1/085 362/276 |
| 5,707,129 A * | 1/1998 | Kobayashi | ............ | B60Q 1/122 362/283 |
| 8,874,312 B2 * | 10/2014 | Park | ............ | B60Q 1/143 315/82 |
| 9,285,094 B2 * | 3/2016 | Matsumoto | ............ | F21S 48/14 |
| 2012/0314434 A1 * | 12/2012 | Park | ............ | B60Q 1/143 362/465 |
| 2014/0293633 A1 * | 10/2014 | Matsumoto | ............ | F21S 48/14 362/512 |

FOREIGN PATENT DOCUMENTS

JP 2012-162121 A 8/2012

* cited by examiner

*Primary Examiner* — Thomas M Sember
(74) *Attorney, Agent, or Firm* — Abelman, Frayne & Schwab

(57) ABSTRACT

At least a part of light emitted from a light source passes through a projection lens. A rotary shade is disposed at the rear side of the projection lens to block a part of the light emitted from the light source. The rotary shade includes a twist end surface. A swivel actuator changes an optical axis direction of the projection lens. A shade driving mechanism rotates the rotary shade around the rotary axis. A first information acquisition unit acquires first information on a rudder angle of the vehicle. A second information acquisition unit acquires second information on the front area of the vehicle. A first control unit controls the swivel actuator to determine the optical axis direction based on the first information. A second control unit controls the shade driving mechanism to determine the position of the twist end surface based on the second information.

12 Claims, 15 Drawing Sheets

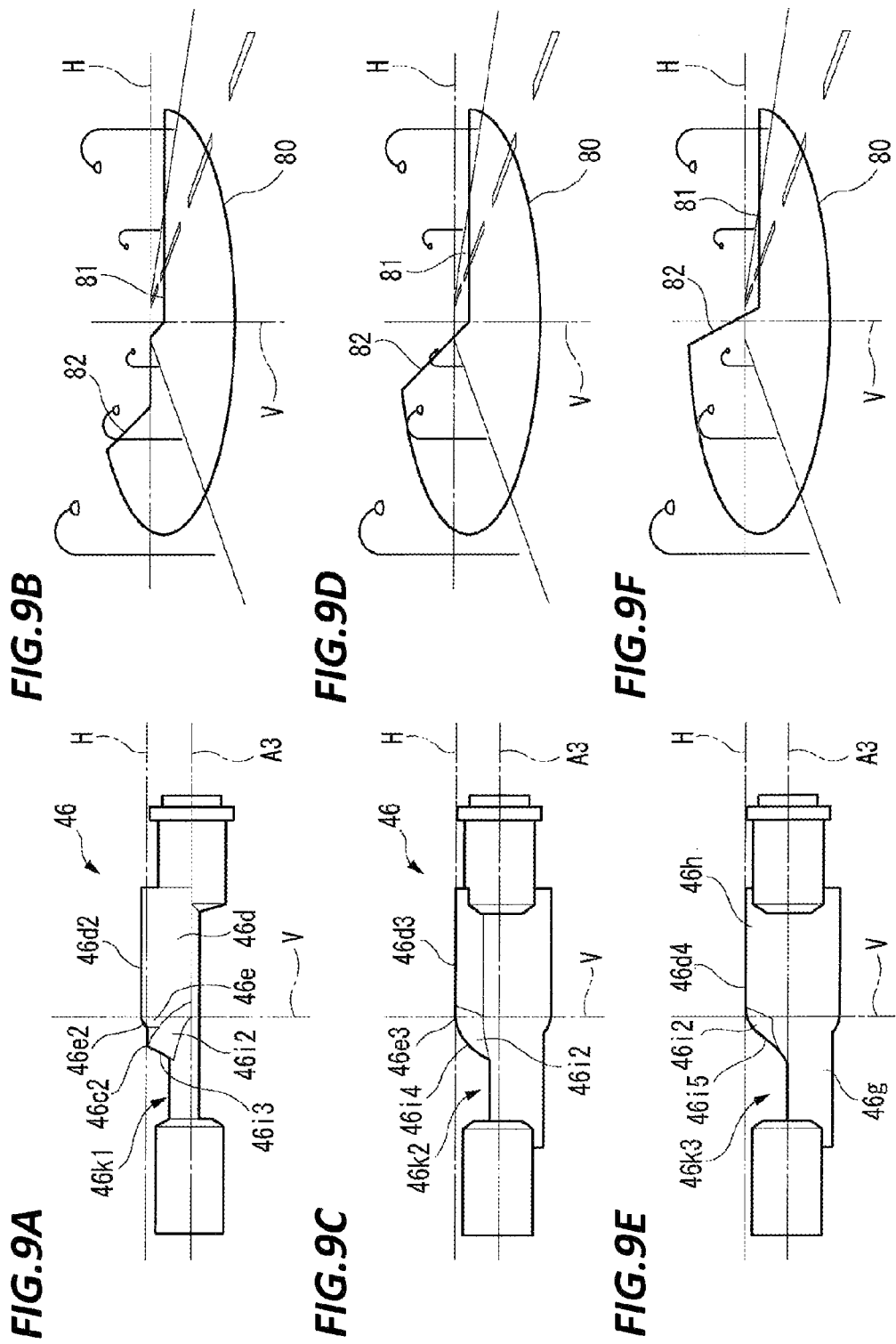

LIGHT DISTRIBUTION CONTROL SYSTEM

CROSS-REFERENCE TO RELATED APPLICATIONS

This application is based on and claims priority from Japanese Patent Application No. 2014-031887, filed on Feb. 21, 2014, with the Japan Patent Office, the disclosure of which is incorporated herein in its entirety by reference.

TECHNICAL FIELD

The disclosure relates to a system for controlling light distribution of a lighting device mounted in a vehicle.

BACKGROUND

An adaptive driving beam (ADB) control has been known as a light distribution control. In this control, when an oncoming vehicle or a pedestrian is detected during illumination by a high beam light distribution, the light which illuminates the region including the detected oncoming vehicle or the detected pedestrian is blocked to form a non-lighting region. Accordingly, it is possible to achieve both suppression of a glare and ensuring of a front area visibility. In this specification, such a light distribution pattern is called "a partial high beam pattern."

A swivel actuator is known for moving an optical axis of a lamp in left and right direction of a vehicle such that an illumination direction is directed to a traveling direction of the vehicle when the vehicle is traveling on, for example, a curved path. There is known a technology of using a swivel actuator to move the position of a non-lighting region of a partial high beam pattern in the left and right directions according to the detected position of an oncoming vehicle or a pedestrian (see, e.g., Japanese Patent

SUMMARY

For example, in a case where an ADB control becomes active due to detection of an oncoming vehicle while a swivel control is active during traveling on a curved path, when the partial high beam pattern is moved in the left and right directions so that the non-lighting region follows the oncoming vehicle, a direction to be illuminated originally by the swivel control may not coincide with the optical axis of the lamp. That is, when the ADB control is prioritized, the illumination for the vehicle traveling direction may be insufficient, and when the swivel control is prioritized, suppression of a glare on the oncoming vehicle may be insufficient. The coordination of both cases may complicate the control so that a load in an integral control unit such as an ECU may be increased.

Accordingly, an object of the present disclosure is to achieve both the suppression of a glare on an oncoming vehicle and the ensuring of the visibility of the vehicle traveling direction while suppressing an increase of a control load.

In order to achieve the object, according to an aspect of the present disclosure, there is provided a system configured to control a light distribution of a lighting device mounted in a vehicle. The system includes: a light source; a projection lens through which at least a part of light emitted from the light source passes; a rotary shade disposed at a rear side of the projection lens to block a part of the light emitted from the light source and having a rotary axis; a first driving mechanism configured to change a direction of an optical axis of the projection lens; and a second driving mechanism configured to rotate the rotary shade on the rotary axis. In particular, the rotary shade includes: a first edge projected to a front area of the projection lens, as a periphery of a first light distribution pattern, when the second driving mechanism rotates the rotary shade to a first angle position; a second edge projected to the front area of the projection lens, as a first periphery of a second light distribution pattern, when the second driving mechanism rotates the rotary shade to a second angle position, the second light distribution pattern having an illumination area larger than an illumination area of the first light distribution pattern; and a twist end surface extending around the rotary axis to intersect the first edge at a first position with respect to a direction of the rotary axis, and to intersect the second edge at a second position with respect to a direction of the rotary axis, the twist end surface includes an edge projected to the front area of the projection lens, as a second periphery of the second light distribution pattern, and the system further includes: a first information acquisition unit configured to acquire first information on a rudder angle of the vehicle; a second information acquisition unit configured to acquire second information on a front area of the vehicle; a first control unit configured to control the first driving mechanism to determine the direction of the optical axis based on the first information; and a second control unit configured to control the second driving mechanism to determine a position of the second periphery based on the second information.

In the configuration, the first control unit may be in charge of the swivel control, and the second control unit may be in charge of the ADB control. The swivel control may not be affected by the ADB control. Accordingly, the optical axis direction of each projection lens is always optimized so that the highest illuminance portion in the second light distribution pattern is disposed at a proper position with respect to the traveling direction of the vehicle. Accordingly, the visibility of the vehicle traveling direction is ensured. Since the ADB control is performed using the twist end surface of the rotary shade, the position of the second periphery may be continuously varied. Accordingly, it is possible to suppress a glare on an oncoming vehicle while suppressing a driver from having an uncomfortable feeling due to a change of the light distribution pattern shape. Since the swivel control based on the rudder angle information of the vehicle and the ADB control based on the front area information of the vehicle may be executed independently from each other, a complicated control design on the assumption of coordination of both controls is not required. Accordingly, it is possible to achieve both the suppression of a glare on an oncoming vehicle and the ensuring of the visibility of the vehicle traveling direction while suppressing an increase of a control load.

The second control unit may control the second driving mechanism to determine the position of the second periphery with respect to the optical axis direction determined by the first control unit, based on the second information.

A lateral displacement amount of the entire light distribution pattern varied by the swivel control is larger than a lateral displacement amount of the second periphery varied by the rotary shade through the ADB control. First, the optical axis direction of each projection lens is determined by the swivel control, and the ADB control is executed based on the direction so that the range of the second periphery displaceable by the rotary shade may be substantially widened. That is, an acting range of a glare suppressing effect may be widened without affecting the ensuring of the visibility of a vehicle traveling direction through the swivel control. Accordingly, it is possible to achieve both the suppression of a glare on an oncoming vehicle and the ensuring of the visibility of the vehicle traveling direction while suppressing an increase of a control load.

The rotary shade includes a peripheral surface extending concentrically around the rotary axis, and the first edge and the second edge may constitute a part of the peripheral surface.

Accordingly, in the configuration, the vertical position of the first edge and the second edge is not changed according to the rotation of the rotary shade. Accordingly, the position of the projection image of the edges is not changed according to the switching between the first light distribution pattern and the second light distribution pattern, and the displacement of the second periphery in the second light distribution pattern. Accordingly, when the light distribution pattern is changed, an uncomfortable feeling of a driver may be suppressed.

The light source includes a first light source and a second light source, and the projection lens includes a first projection lens and a second projection lens. The first projection lens is disposed such that the first light distribution pattern is formed by light emitted from the first light source. The second projection lens and the rotary shade are disposed such that a part of the second light distribution pattern including the second periphery is formed by light emitted from the second light source. In this case, the first driving mechanism is configured to change a direction of an optical axis of at least the first projection lens.

In the configuration, even in a case where an optical system for forming the first light distribution pattern and an optical system for forming the second light distribution pattern are provided independently from each other, the independence of each of the swivel control and the ADB control may be improved.

Here, the first driving mechanism may be configured to change the optical axis direction of the first projection lens and the optical axis direction of the second projection lens at once.

In the configuration, even in a case where an optical system for forming the first light distribution pattern and an optical system for forming the second light distribution pattern are provided independently from each other, the second control unit may determine the position of the second periphery based on the optical axis direction of the projection lens determined by the first control unit. That is, an acting range of a glare suppressing effect may be widened without affecting the ensuring of the visibility of a vehicle traveling direction through the swivel control.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 9A to 9F are views illustrating the relationship between a rotation angle position of the left rotary shade and a formed light distribution pattern.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Exemplary embodiments of the present disclosure will be described in detail with reference to accompanying drawings. In each of the drawings used for the following descriptions, the size of each member is suitably changed to a recognizable size in scale. "The right side" and "the left side" in the following descriptions indicate right and left directions viewed from a driver seat, respectively, unless otherwise specified.

Figure 1:
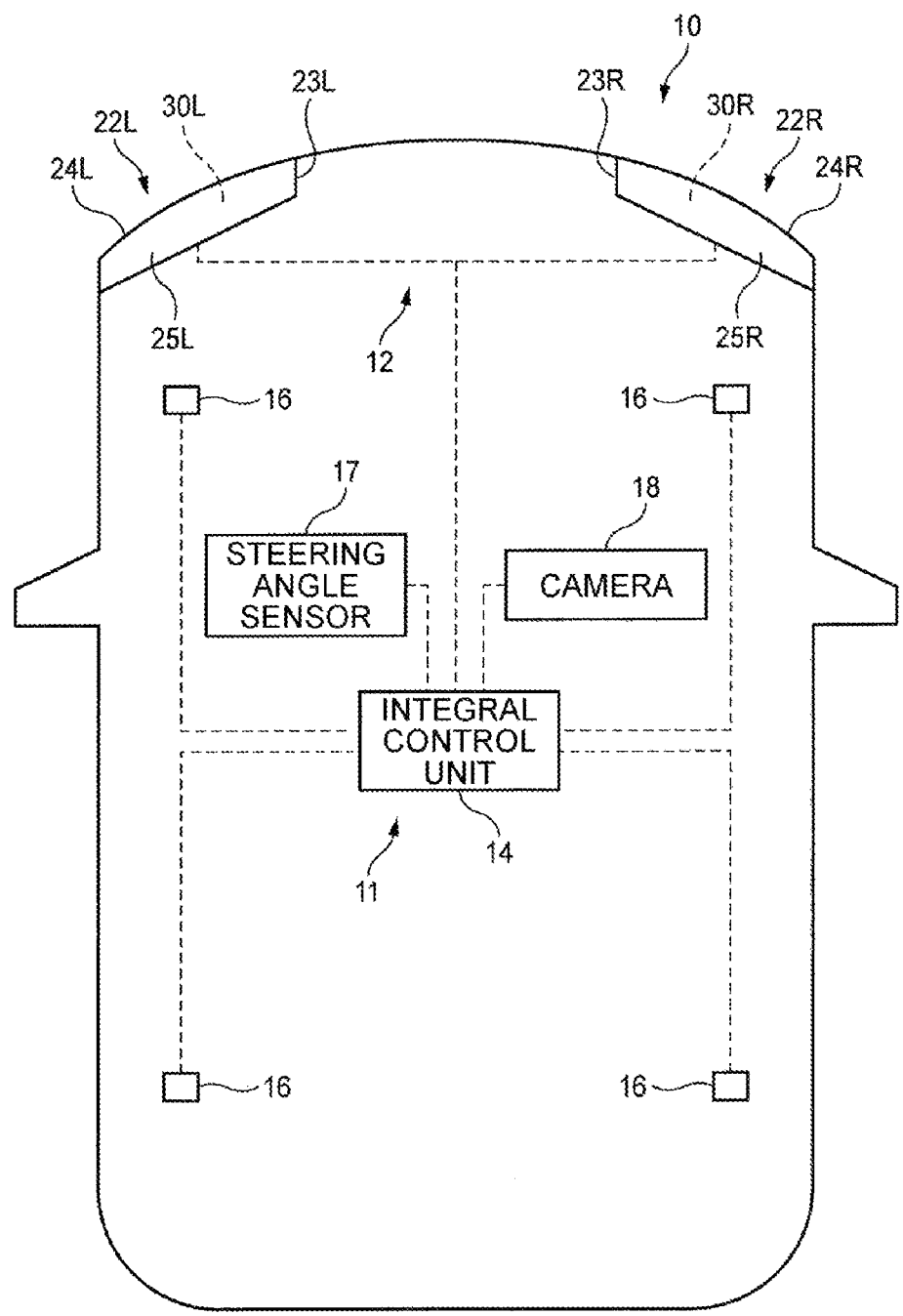
FIG. 1 is a view schematically illustrating the entire configuration of a vehicle mounted with a headlight control system according to a first exemplary embodiment of the present disclosure.

FIG. 1 schematically illustrates the entire configuration of a vehicle 10 mounted with a headlight control system 11 (e.g., a light distribution control system) according to a first exemplary embodiment of the present disclosure. The headlight control system 11 controls light distribution of a headlight device 12 (e.g., a lighting device) mounted in the vehicle 10. The headlight control system 11 includes an integral control unit 14, wheel speed sensors 16, a steering angle sensor 17, and a camera 18.

The integral control unit 14 includes, for example, a CPU for executing various arithmetic processings, a ROM for storing various control programs, and a RAM used as a work area for storing data or executing programs, and performs various controls in the vehicle 10.

Each of the wheel speed sensors 16 is provided to correspond to each of four wheels (e.g., left, right, front and rear wheels) assembled with the vehicle 10. Each of the wheel speed sensors 16 is connected to communicate with the integral control unit 14, and outputs a signal according to a rotation speed of the wheel to the integral control unit 14. The integral control unit 14 calculates the speed of the vehicle 10 using the signal input from each of the wheel speed sensors 16.

The steering angle sensor 17 is provided in a steering wheel and is connected to communicate with the integral control unit 14. The steering angle sensor 17 outputs a signal corresponding to a steering rotation angle of the steering wheel operated by a driver to the integral control unit 14. The integral control unit 14 calculates the traveling direction of the vehicle 10 using the signal input from the steering angle sensor 17.

The camera 18 includes an imaging element such as, for example, a charged coupled device (CCD) sensor or a complementary metal oxide semiconductor (CMOS) sensor, and captures the front area of the vehicle to generate image data. The camera 18 is connected to communicate with the integral control unit 14, and the generated image data are output to the integral control unit 14.

The headlight device 12 includes a right headlight unit 22R disposed at the front right side of the vehicle 10, and a left headlight unit 22L disposed at the front left side of the vehicle 10. In the right headlight unit 22R, a translucent cover 24R is mounted in a lamp body 23R to define a lamp chamber 25R.

Figure 2:
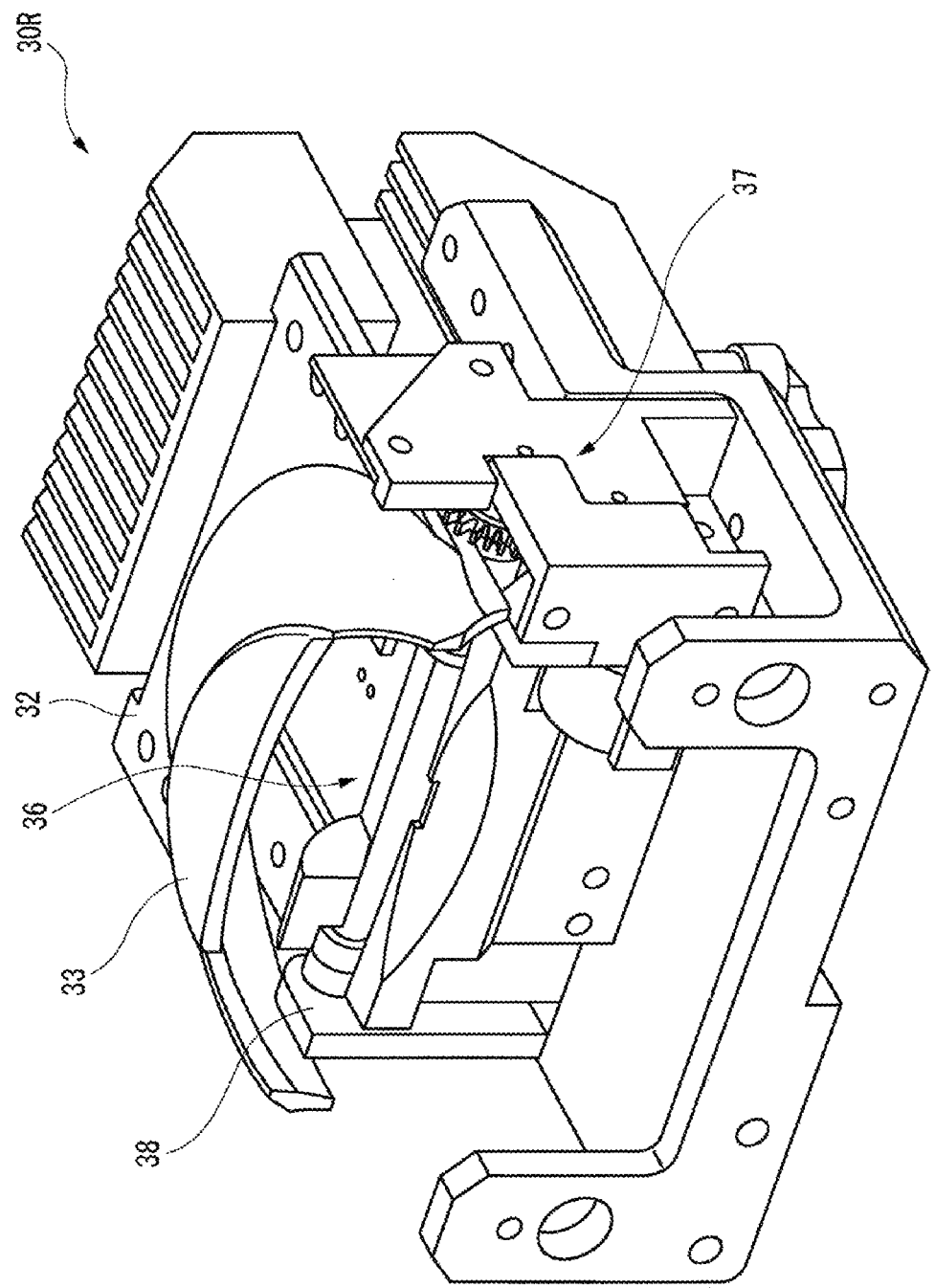
FIG. 2 is a perspective view illustrating a part of a right lamp unit provided in the headlight control system.
Figure 3A:
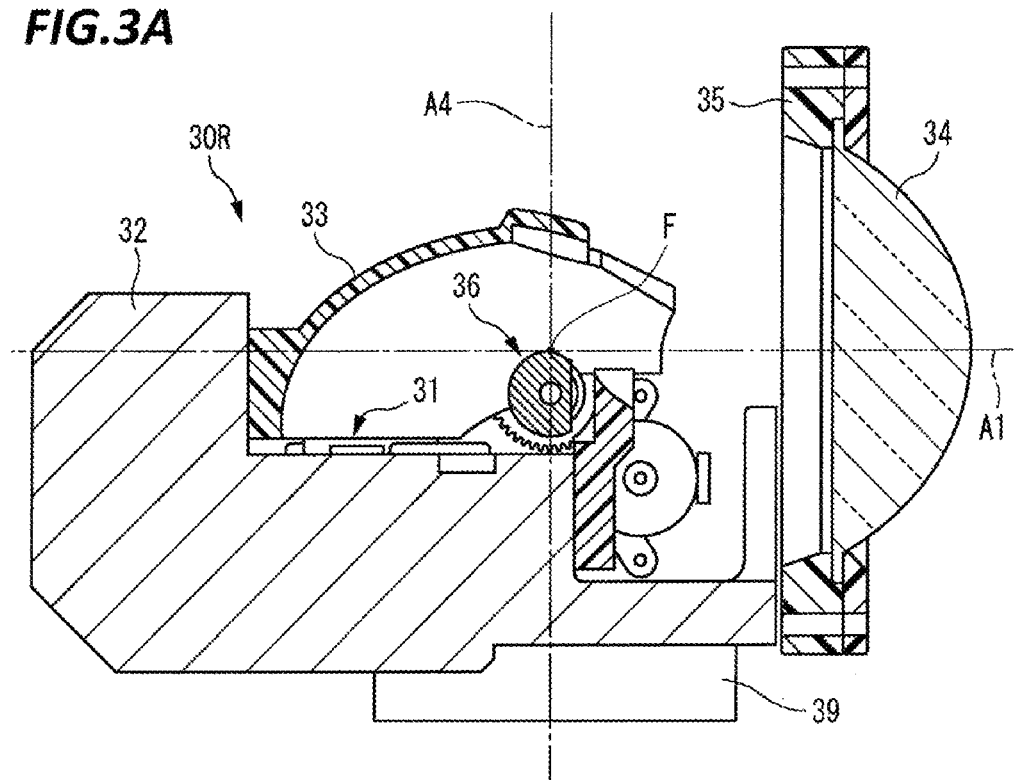
FIGS. 3A and 3B are views illustrating the positional relationship between elements of the right lamp unit.

FIG. 2 is a perspective view illustrating a part of a right lamp unit 30R accommodated in the lamp chamber 25R of the right headlight unit 22R. FIG. 3A is a vertical cross-sectional view illustrating the positional relationship between partial elements constituting the right lamp unit 30R. The right lamp unit 30R includes a light source 31, a heat sink 32, a reflector 33, a projection lens 34, a lens holder 35, a right rotary shade 36, a shade driving mechanism 37, and a support 38.

The light source 31 is a semiconductor light emitting element such as a white light emitting diode LED or an organic EL element. The light source 31 is fixed to the heat sink 32. The material and the shape of the heat sink 32 are suitable for dissipating the heat emitted from the light source 31. The light emitted from the light source 31 is reflected by the reflector 33 to be directed forward. At least a part of the light passes through the projection lens 34 disposed ahead of the reflector 33.

The reflector 33 includes a reflecting surface based on an ellipsoid on an optical axis A1 extending in the front and rear directions of the vehicle 10. The light source 31 is disposed at the first focus of the ellipse which constitutes the vertical cross section of the reflecting surface. Accordingly, the light emitted from the light source 31 is converged on the second focus of the ellipse.

The projection lens 34 is made of a resin. The projection lens 34 is disposed such that the rear focus F coincides with the second focus of the reflecting surface of the reflector 33, and is configured to project the image on the rear focus F to the front area of the vehicle 10 as an inverted image. The periphery of the projection lens 34 is held by the lens holder 35, and is fixed to the heat sink 32.

Figure 3B:
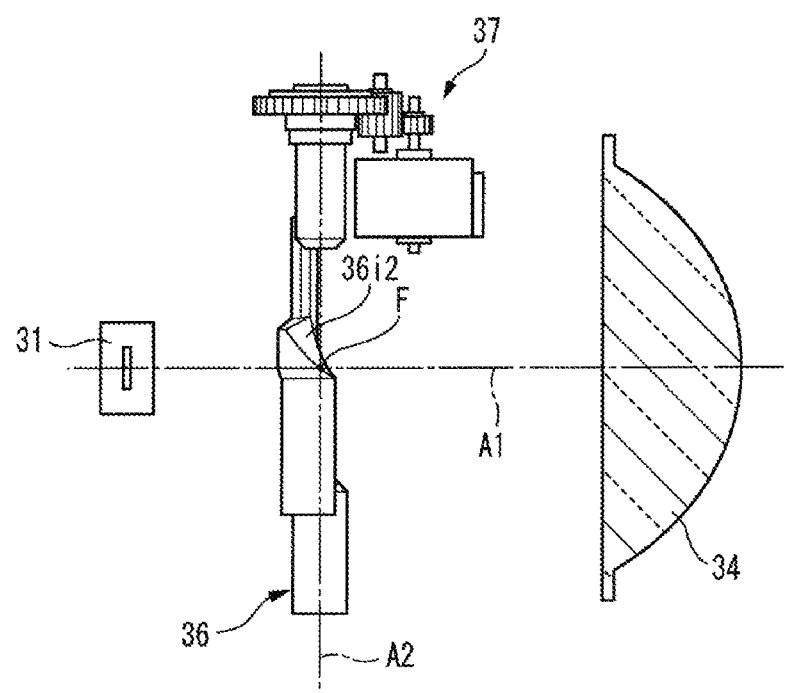

FIG. 3B is a plan view illustrating the positional relationship between partial elements constituting the right lamp unit 30R. The right rotary shade 36 is disposed at the rear side of the projection lens 34 to block a part of light emitted from the light source 31. The right rotary shade 36 includes a rotary axis A2, and is disposed such that the rotary axis A2 passes through the lower side of the rear focus F of the projection lens 34.

The shade driving mechanism 37 is fixed to the left end in the axial direction of the right rotary shade 36. The shade driving mechanism 37 includes a motor and a gear mechanism to rotate the right rotary shade 36 around the rotary axis A2. Specifically, the motor and the gear mechanism are driven according to the control signal input from the integral control unit 14 of the vehicle 10 to rotate the right rotary shade 36 at an angle and in a direction according to the signal. As illustrated in FIG. 2, the support 38 rotatably supports the right end in the axial direction of the right rotary shade 36.

Figure 4:
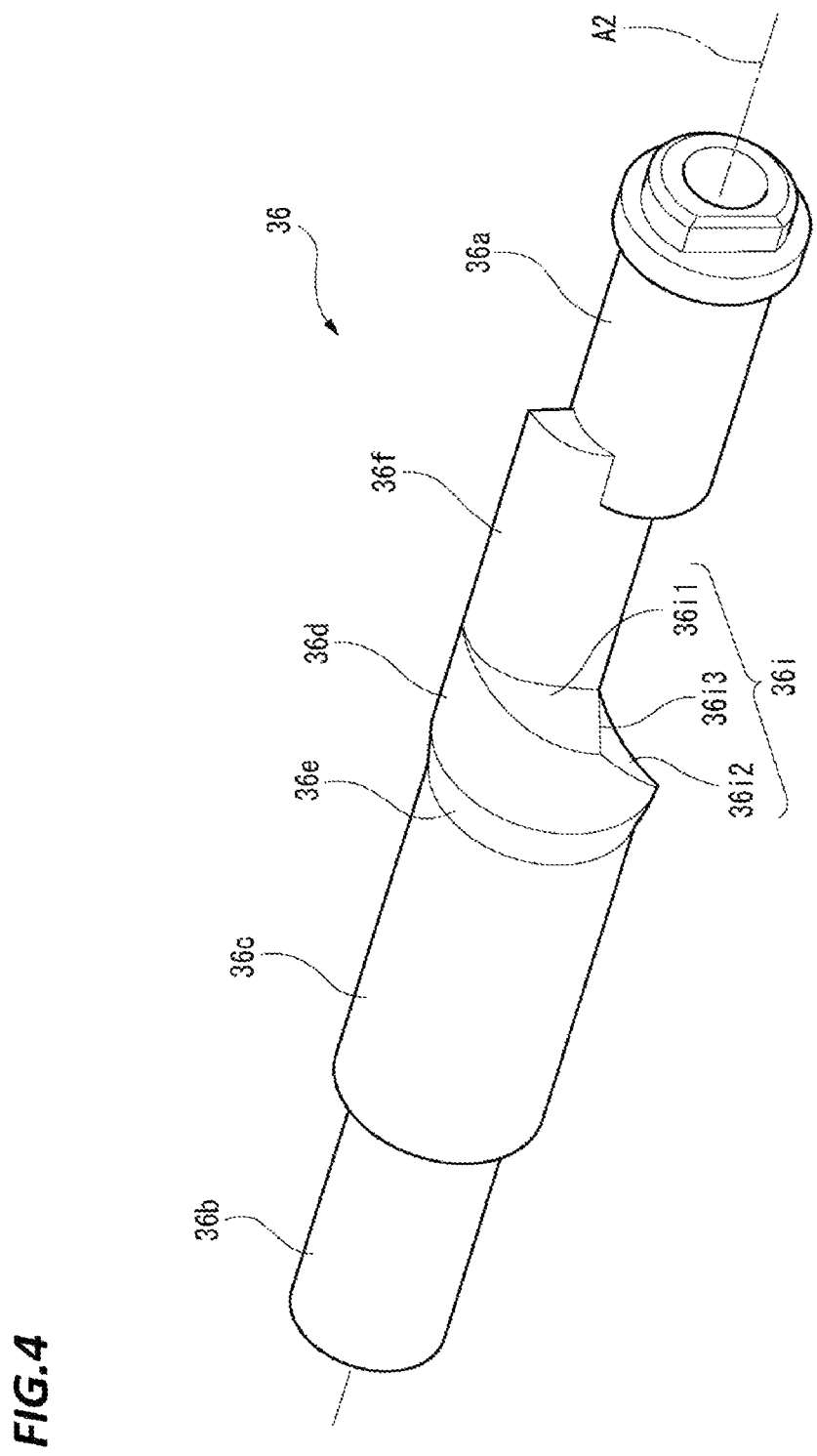
FIG. 4 is a perspective view illustrating the exterior of a right rotary shade provided in the right lamp unit.

FIG. 4 is a perspective view illustrating the exterior of the right rotary shade 36. As described below in detail with reference to FIGS. 5A to 6F, the right rotary shade 36 is formed into a shape having peripheral surfaces and end surfaces in which different shapes of edges are disposed near the rear focus F of the projection lens 34 according to the rotation angles on the rotary axis A2 through the driving by the shade driving mechanism 37.

The light emitted from the light source 31 is reflected by the reflector 33 to be directed forward. A part of the light is blocked by the right rotary shade 36. Here, the shape of the edge disposed near the rear focus F of the projection lens 34 is projected as a part of the periphery of a light distribution pattern formed at the front area of the vehicle 10.

The right rotary shade 36 includes a first end 36a. The first end 36a is disposed at the left end of the right rotary shade 36. The first end 36a includes an axial hole formed coaxially with the rotary axis A2. The axial hole is coupled with the shade driving mechanism 37.

The right rotary shade 36 includes a second end 36b. The second end 36b is disposed at the right end of the right rotary shade 36. The second end 36b includes an axial hole formed coaxially with the rotary axis A2. The axial hole is coupled with the support 38.

The right rotary shade 36 includes a first peripheral surface 36c. The first peripheral surface 36c is disposed at the left side of the second end 36b. The first peripheral surface 36c extends in the left and right directions of the right rotary shade 36 to be parallel to the rotary axis A2. The first peripheral surface 36c extends concentrically around the rotary axis A2. That is, a distance between the first peripheral surface 36c and the rotary axis A2 is fixed.

The right rotary shade 36 includes a second peripheral surface 36d. The second peripheral surface 36d is disposed at the left side of the first peripheral surface 36c. The second peripheral surface 36d extends in the left and right directions of the right rotary shade 36 to be parallel to the rotary axis A2. The second peripheral surface 36d extends concentrically around the rotary axis A2. That is, a distance between the second peripheral surface 36d and the rotary axis A2 is fixed. Also, the distance between the second peripheral surface 36d and the rotary axis A2 is larger than the distance between the first peripheral surface 36c and the rotary axis A2.

The right rotary shade 36 includes a third peripheral surface 36e. The third peripheral surface 36e extends to connect the first peripheral surface 36c to the second peripheral surface 36d. The third peripheral surface 36e forms a slope surface extending in a direction not parallel to the rotary axis A2.

The right rotary shade 36 includes a fourth peripheral surface 36f. The fourth peripheral surface 36f is disposed at the left side of the second peripheral surface 36d. The fourth peripheral surface 36*f* extends in the left and right directions of the right rotary shade 36 to be parallel to the rotary axis A2. The fourth peripheral surface 36*f* extends non-concentrically around the rotary axis A2. That is, a distance between the fourth peripheral surface 36*f* and the rotary axis A2 varies according to a rotation angle on the rotary axis A2 of the right rotary shade 36.

Figure 6A:
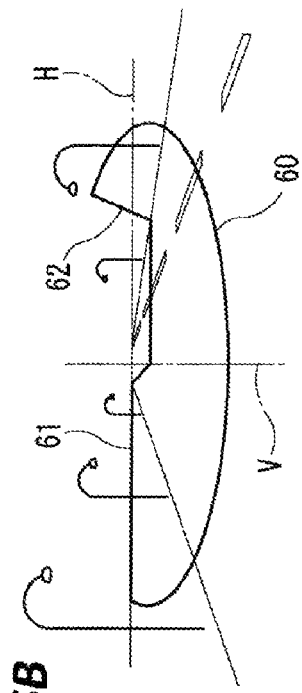
FIGS. 6A to 6F are views illustrating the relationship between a rotation angle position of the right rotary shade and a formed light distribution pattern.
Figure 6B:
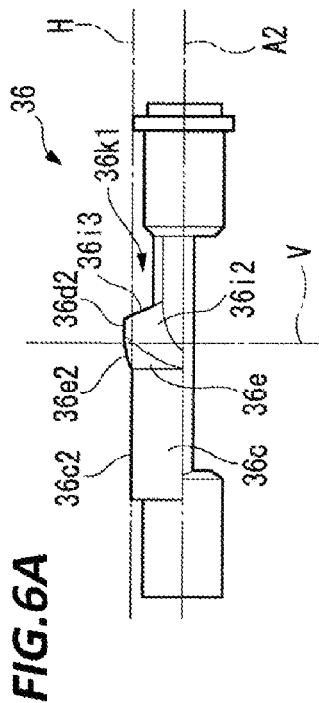
Figure 6C:
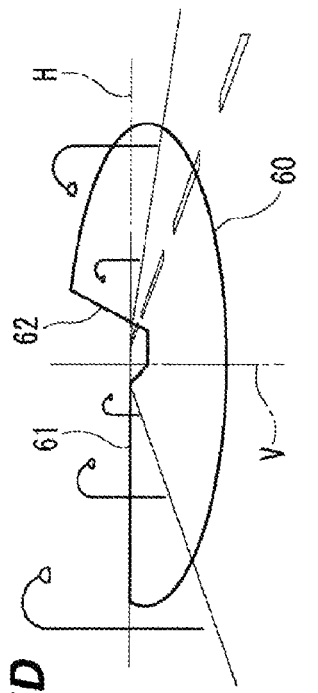
Figure 6D:
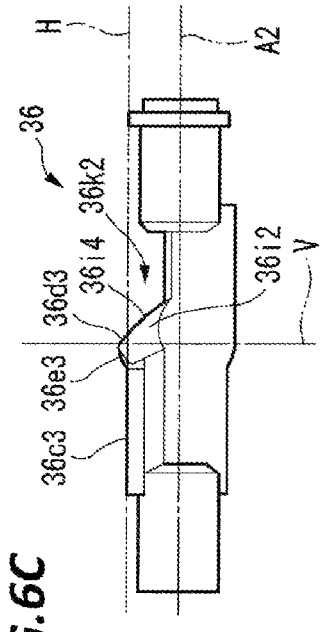
Figure 6E:
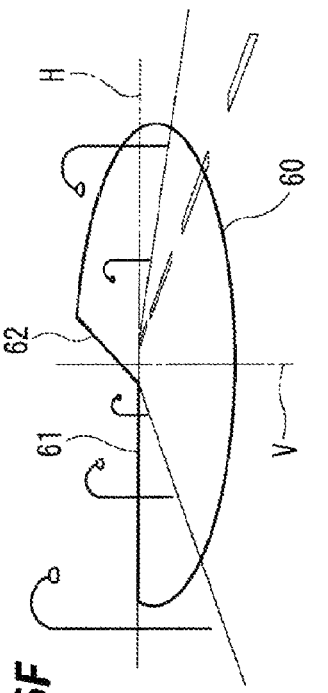

FIG. 6E illustrates the exterior of the right rotary shade 36 when viewed from the opposite direction to that of FIG. 4. The right rotary shade 36 includes a first flat surface 36*g*. The first flat surface 36*g* extends in the left and right directions of the right rotary shade 36 to be parallel to the rotary axis A2. The first flat surface 36*g* is continued to one circumferential end of the first peripheral surface 36*c*, one circumferential end of the second peripheral surface 36*d*, one circumferential end of the third peripheral surface 36*e*, and one circumferential end of the fourth peripheral surface 36*f*.

The right rotary shade 36 includes a second flat surface 36*h*. The second flat surface 36*h* extends in the left and right directions of the right rotary shade 36 to be parallel to the rotary axis A2. The other circumferential end of the first peripheral surface 36*c* is continued to the second flat surface 36*h*.

As illustrated in FIGS. 4 and 6E, the right rotary shade 36 includes a twist end surface 36*i*. The twist end surface 36*i* includes a first portion 36*i*1 and a second portion 36*i*2. The first portion 36*i*1 extends to connect the second peripheral surface 36*d* to the fourth peripheral surface 36*f*. The second portion 36*i*2 extends to connect the first portion 36*i*1 to the second flat surface 36*h*. The first portion 36*i*1 and the second portion 36*i*2 are separated from each other by a boundary edge 36*i*3.

The twist end surface 36*i* extends around the rotary axis A2. One circumferential end of the twist end surface 36*i* is continued to the first flat surface 36*g*. The other circumferential end of the twist end surface 36*i* is continued to the second flat surface 36*h*. The position of the twist end surface 36*i* continued to the first flat surface 36*g* and the position of the twist end surface 36*i* continued to the second flat surface 36*h* are different from each other with respect to the direction of the rotary axis A2. That is, the projection position of one circumferential end of the twist end surface 36*i* on the rotary axis A2 is different from the projection position of the other circumferential end of the twist end surface 36*i* on the rotary axis A2.

Figure 5A:
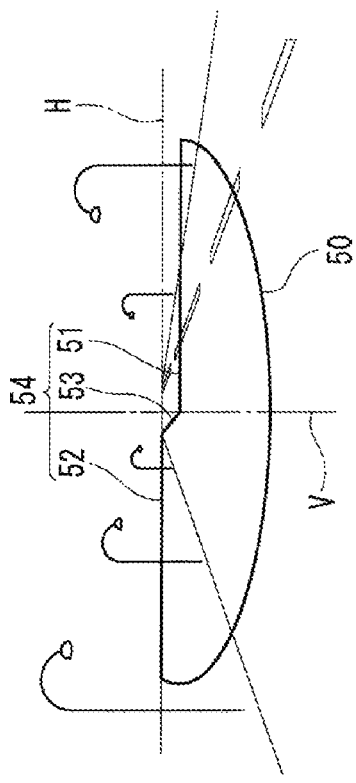
FIGS. 5A to 5D are views illustrating the relationship between a rotation angle position of the right rotary shade and a formed light distribution pattern.

FIG. 5A illustrates the right rotary shade 36 rotated by 180° from the state illustrated in FIG. 3B in the front view of the vehicle 10. Here, at the upper side of the rotary axis A2, edges formed by the first peripheral surface 36*c*, the second peripheral surface 36*d*, and the third peripheral surface 36*e* are disposed near the rear focus F of the projection lens 34. An edge 36*c*1 formed by the first peripheral surface 36*c* is disposed at the left side of the optical axis A1 (e.g., corresponding to an intersection of a horizontal reference line H and a vertical reference line V) of the projection lens 34 in the front view of the vehicle 10 to extend in parallel to the rotary axis A2. An edge 36*d*1 formed by the second peripheral surface 36*d* is disposed at the right side of the optical axis A1 in the front view of the vehicle 10 to extend in parallel to the rotary axis A2. An edge 36*e*1 formed by the third peripheral surface 36*e* is disposed at the left side of the optical axis A1 in the front view of the vehicle 10 to extend diagonally with respect to the rotary axis A2 and to connect the edge 36*c*1 to the edge 36*d*1.

Figure 5B:
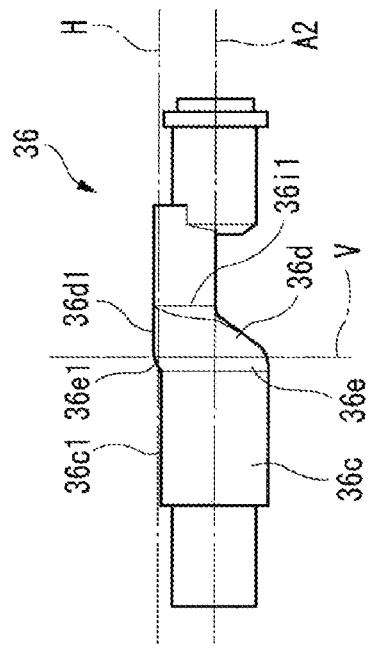

FIG. 5B illustrates a light distribution pattern formed when the edges 36*c*1, 36*d*1, and 36*e*1 are projected to a virtual vertical screen disposed ahead of the vehicle 10. The light distribution pattern corresponds to a right low beam pattern 50 (e.g., a first light distribution pattern). The right low beam pattern 50 is a light distribution pattern which is illuminated at the near front area of the vehicle 10 without giving a glare to an oncoming vehicle.

The right low beam pattern 50 includes a first horizontal cutoff line 51, a second horizontal cutoff line 52, and a slope cutoff line 53 on the upper edge thereof. In the following description, the first horizontal cutoff line 51, the second horizontal cutoff line 52, and the slope cutoff line 53 are collectively referred to as "a right horizontal cutoff line 54" as necessary.

The first horizontal cutoff line 51 is formed by the edge 36*d*1. The first horizontal cutoff line 51 extends in parallel to the horizontal reference line H at the right side of the vertical reference line V and at the lower side of the horizontal reference line H, and is used as an oncoming lane-side cutoff line. The second horizontal cutoff line 52 is formed by the edge 36*c*1. The second horizontal cutoff line 52 extends along the horizontal reference line H at the left side of the vertical reference line V, and is used as an own lane-side cutoff line. The slope cutoff line 53 is formed by the edge 36*e*1. The slope cutoff line 53 extends diagonally from the left end of the first horizontal cutoff line 51 toward the left upper side, and is connected to the right end of the second horizontal cutoff line 52.

That is, when the shade driving mechanism 37 (e.g., a second driving mechanism) rotates the right rotary shade 36 to the position illustrated in FIG. 5A (e.g., a first angle position), the edges 36*c*1, 36*d*1, and 36*e*1 (e.g., a first edge of the rotary shade) are projected to the front area of the projection lens 34 as the right horizontal cutoff line 54 (e.g., a periphery of the first light distribution pattern). The light passing through the upper side of the edges 36*c*1, 36*d*1, and 36*e*1 illuminates the lower side of the right horizontal cutoff line 54.

Figure 5C:
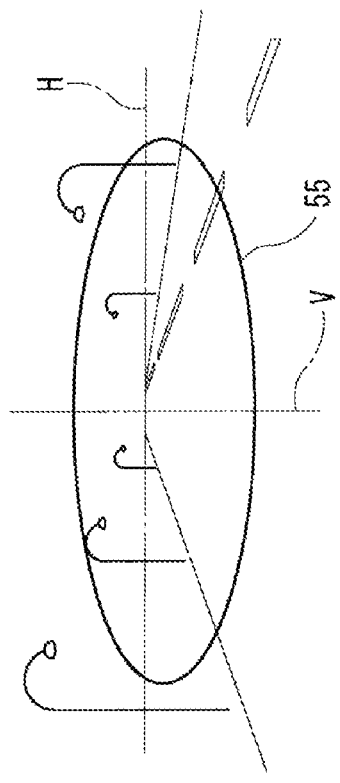

FIG. 5C illustrates the right rotary shade 36 rotated clockwise by 90° from the state illustrated in FIG. 5A when viewed from the right side, in the front view of the vehicle 10. Here, a space 36*j* is defined by the first flat surface 36*g* and the second flat surface 36*h* at the upper side of the rotary axis A2.

Figure 5D:
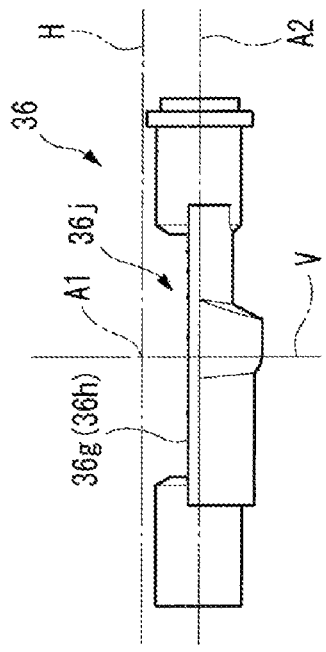

The space 36*j* includes the optical axis A1 of the projection lens 34. Thus, the light emitted from the light source 31 and reflected by the reflector 33 is not blocked but passes through the space 36*j* and the projection lens 34 to form a right high beam pattern 55 at the front area of the vehicle 10 as illustrated in FIG. 5D. The right high beam pattern 55 is a light distribution pattern which is illuminated in a wide range ahead of the vehicle 10 to the far side.

FIG. 6A illustrates the right rotary shade 36 rotated counterclockwise by 90° from the state illustrated in FIG. 5A when viewed from the right side, in the front view of the vehicle 10. Here, at the upper side of the rotary axis A2, edges 36*c*2, 36*d*2, and 36*e*2 formed by the first peripheral surface 36*c*, the second peripheral surface 36*d*, and the third peripheral surface 36*e*, respectively, and the boundary edge 36*i*3 of the twist end surface 36*i* are disposed near the rear focus F of the projection lens 34. The edge 36*c*2 formed by the first peripheral surface 36*c* is disposed at the left side of the optical axis A1 of the projection lens 34 in the front view of the vehicle 10 to extend in parallel to the rotary axis A2. The edge 36*d*2 formed by the second peripheral surface 36*d* is disposed at the right side of the optical axis A1 in the front view of the vehicle 10 to extend in parallel to the rotary axis A2. The edge 36*e*2 formed by the third peripheral surface 36e is disposed at the left side of the optical axis A1 in the front view of the vehicle 10, and extends diagonally with respect to the rotary axis A2 to connect the edge 36c2 to the edge 36d2. The boundary edge 36i3 of the twist end surface 36i is disposed at the right side of the optical axis A1 in the front view of the vehicle 10, and extends diagonally with respect to the rotary axis A2. A space 36k1 is defined at the right side of the boundary edge 36i3.

FIG. 6B illustrates a light distribution pattern formed when the edges 36c2, 36d2, 36e2, and 36i3 are projected to the virtual vertical screen disposed at the front area of the vehicle 10. The light distribution pattern corresponds to a partial right high beam pattern 60 (e.g., a second light distribution pattern). The partial right high beam pattern 60 has an illumination area larger than the right low beam pattern 50 and smaller than the right high beam pattern 55.

The partial right high beam pattern 60 includes a horizontal cutoff line 61 and a vertical cutoff line 62. The horizontal cutoff line 61 (e.g., a first periphery of the second light distribution pattern) is formed by the edges 36c2, 36d2, and 36e2 (e.g., a second edge of the rotary shade). The horizontal cutoff line 61 extends along the horizontal reference line H. The vertical cutoff line 62 (e.g., a second periphery of the second light distribution pattern) is formed by the boundary edge 36i3 (e.g., the edge of the twist end surface) of the twist end surface 36i. The vertical cutoff line 62 extends diagonally from the right end of the horizontal cutoff line 61 toward the right upper side.

That is, when the shade driving mechanism 37 rotates the right rotary shade 36 to the position illustrated in FIG. 6A (e.g., a second angle position), the edges 36c2, 36d2 and 36e2 are projected to the front area of the projection lens 34 as the horizontal cutoff line 61, and the boundary edge 36i3 is projected to the front area of the projection lens 34 as the vertical cutoff line 62. The light passing through the upper side of the edges 36c2, 36d2, and 36e2 illuminates the lower side of the horizontal cutoff line 61. The light passing through the space 36k1 illuminates the right side of the vertical cutoff line 62. The use of the partial right high beam pattern 60 will be described later.

FIG. 6C illustrates the right rotary shade 36 rotated counterclockwise by 45° from the state illustrated in FIG. 6A when viewed from the right side, in the front view of the vehicle 10. Here, at the upper side of the rotary axis A2, edges 36c3, 36d3, and 36e3 formed by the first peripheral surface 36c, the second peripheral surface 36d, and the third peripheral surface 36e, respectively, and an outer peripheral edge 36i4 of the second portion 36i2 of the twist end surface 36i are disposed near the rear focus F of the projection lens 34. The edge 36c3 formed by the first peripheral surface 36c is disposed at the left side of the optical axis A1 of the projection lens 34 in the front view of the vehicle 10 to extend in parallel to the rotary axis A2. The edge 36d3 formed by the second peripheral surface 36d is disposed at the right side of the optical axis A1 in the front view of the vehicle 10 to extend in parallel to the rotary axis A2. The edge 36e3 formed by the third peripheral surface 36e is disposed at the left side of the optical axis A1 in the front view of the vehicle 10 to extend diagonally with respect to the rotary axis A2 to connect the edge 36c3 to the edge 36d3. The outer peripheral edge 36i4 of the second portion 36i2 of the twist end surface 36i is disposed at the right side of the optical axis A1 in the front view of the vehicle 10 to extend diagonally with respect to the rotary axis A2. A space 36k2 is defined at the right side of the outer peripheral edge 36i4.

FIG. 6D illustrates a light distribution pattern formed when the edges 36c3, 36d3, and 36e3 and the outer peripheral edge 36i4 are projected to the virtual vertical screen disposed at the front area of the vehicle 10. The light distribution pattern is also an example of the partial right high beam pattern 60. The horizontal cutoff line 61 is formed by the edges 36c3, 36d3, and 36e3 (e.g., the second edge of the rotary shade), and the vertical cutoff line 62 is formed by the outer peripheral edge 36i4 (e.g., the edge of the twist end surface).

That is, when the shade driving mechanism 37 rotates the right rotary shade 36 to the position illustrated in FIG. 6C (e.g., the second angle position), the edges 36c3, 36d3, and 36e3 are projected to the front area of the projection lens 34 as the horizontal cutoff line 61, and the outer peripheral edge 36i4 is projected to the front area of the projection lens 34 as the vertical cutoff line 62. The light passing through the upper side of the edges 36c3, 36d3, and 36e3 illuminates the lower side of the horizontal cutoff line 61. The light passing through the space 36k2 illuminates the right side of the vertical cutoff line 62. In comparison to the state illustrated in FIG. 6B, the vertical cutoff line 62 is closer to the vertical reference line V, and the right illumination area of the vertical cutoff line 62 is wider.

FIG. 6E illustrates the right rotary shade 36 rotated counterclockwise by 45° from the state illustrated in FIG. 6C when viewed from the right side, in the front view of the vehicle 10. Here, at the upper side of the rotary axis A2, an edge 36c4 formed by the first peripheral surface 36c and an outer peripheral edge 36i5 of the second portion 36i2 of the twist end surface 36i are disposed near the rear focus F of the projection lens 34. The edge 36c4 formed by the first peripheral surface 36c is disposed at the left side of the optical axis A1 of the projection lens 34 in the front view of the vehicle 10 to extend in parallel to the rotary axis A2. The outer peripheral edge 36i5 of the second portion 36i2 of the twist end surface 36i extends diagonally with respect to the rotary axis A2 across the vertical reference line V. A space 36k3 is defined at the right side of the outer peripheral edge 36i5.

Figure 6F:
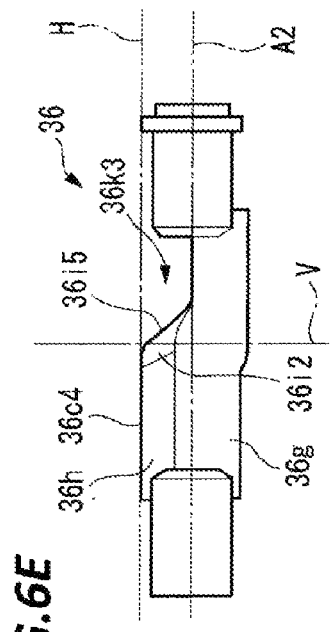

FIG. 6F illustrates a light distribution pattern formed when the edge 36c4 and the outer peripheral edge 36i5 are projected to the virtual vertical screen disposed at the front area of the vehicle 10. The light distribution pattern is also an example of the partial right high beam pattern 60. The horizontal cutoff line 61 is formed by the edge 36c4 and the vertical cutoff line 62 is formed by the outer peripheral edge 36i5.

That is, when the shade driving mechanism 37 rotates the right rotary shade 36 to the position illustrated in FIG. 6E (e.g., the second angle position), the edge 36c4 (e.g., the second edge of the rotary shade) is projected to the front area of the projection lens 34 as the horizontal cutoff line 61, and the outer peripheral edge 36i5 (e.g., the edge of the twist end surface) is projected to the front area of the projection lens 34 as the vertical cutoff line 62. The light passing through the upper side of the edge 36c4 illuminates the lower side of the horizontal cutoff line 61. The light passing through the space 36k3 illuminates the right side of the vertical cutoff line 62. In comparison to the state illustrated in FIG. 6D, the vertical cutoff line 62 is closer to the vertical reference line V, and the right illumination area of the vertical cutoff line 62 is wider.

When the shade driving mechanism 37 rotates the right rotary shade 36 between the positions illustrated in FIGS. 6A and 6E, a part of the twist end surface 36i projected as the vertical cutoff line 62 of the partial right high beam pattern 60 is displaced in the left and right directions of the right rotary shade 36. Since the twist end surface 36i continuously extends around the rotary axis A2, the position of the vertical cutoff line 62 may be continuously changed in the left and right directions.

As described above, the right rotary shade 36 includes the first peripheral surface 36c extending concentrically around the rotary axis A2. Accordingly, the vertical position of the edges 36c1 to 36c4 to be projected to the front area is not changed according to the rotation of the right rotary shade 36. Accordingly, the position of the projection image of the edge (e.g., the second horizontal cutoff line 52, and the horizontal cutoff line 61) is not changed according to the switching between the right low beam pattern 50 and the partial right high beam pattern 60, and the displacement of the vertical cutoff line 62 in the partial right high beam pattern 60. Accordingly, when the light distribution pattern is changed, an uncomfortable feeling of a driver may be suppressed.

As illustrated in FIG. 1, a left lamp unit 30L is accommodated in a lamp chamber 25L of the left headlight unit 22L. The left lamp unit 30L has the same configuration as that of the right lamp unit 30R illustrated in FIG. 2, and thus illustration and repetitive descriptions thereof will be omitted. The left lamp unit 30L includes a left rotary shade 46 instead of the right rotary shade 36 provided in the right lamp unit 30R illustrated in FIG. 2.

Figure 7:
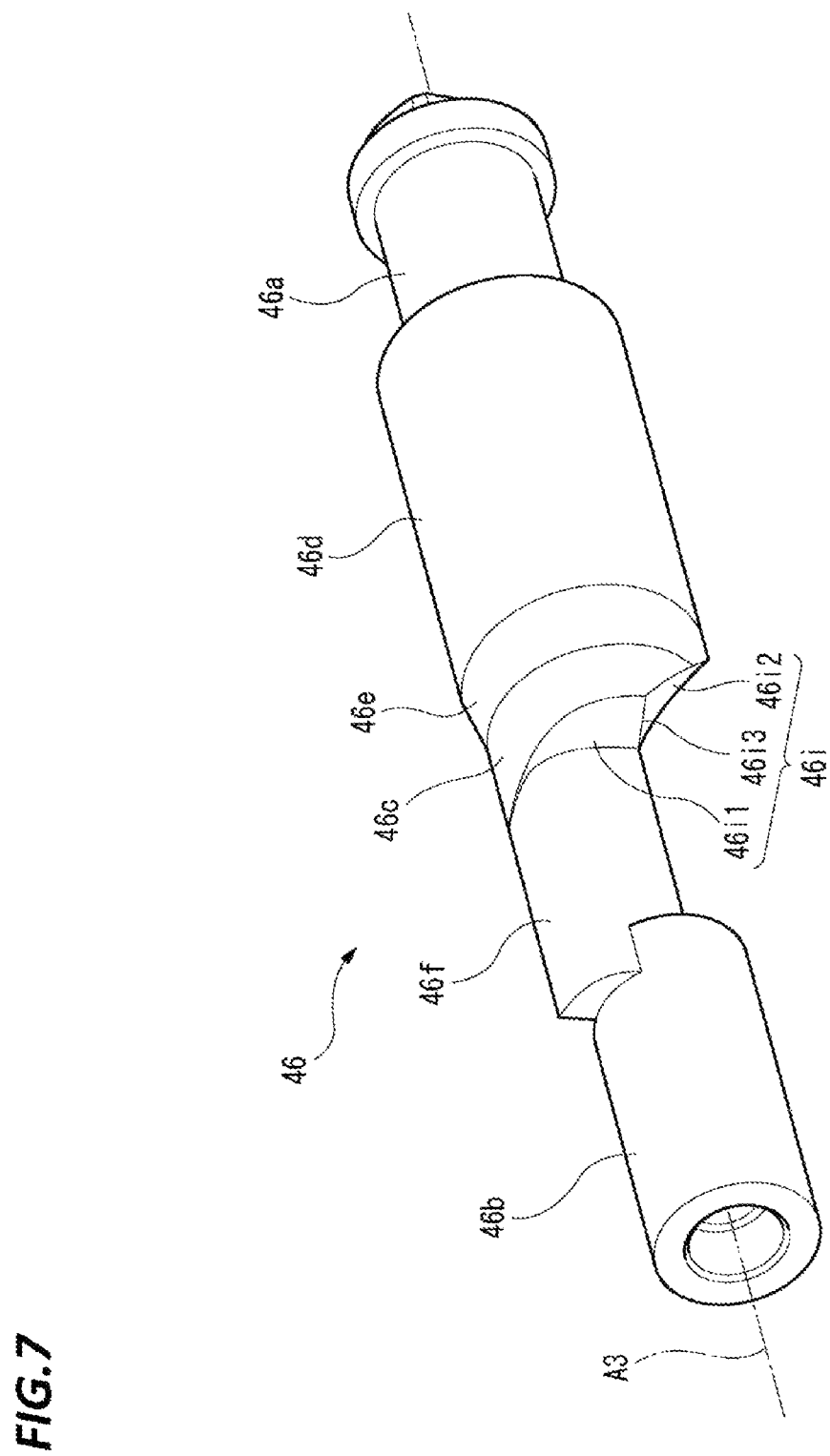
FIG. 7 is a perspective view illustrating the exterior of a left rotary shade provided in a left lamp unit as a part of the headlight control system.

FIG. 7 is a perspective view illustrating the exterior of the left rotary shade 46. The left rotary shade 46 includes a rotary axis A3. As described below in detail with reference to FIGS. 8A to 9F, the left rotary shade 46 is formed into a shape having peripheral surfaces and end surfaces in which different shapes of edges are disposed near the rear focus F of the projection lens 34 according to the rotation angles on the rotary axis A3 through the driving by the shade driving mechanism 37.

The light emitted from the light source 31 is reflected by the reflector 33 to be directed forward. A part of the light is blocked by the left rotary shade 46. Here, the shape of the edge disposed near the rear focus F of the projection lens 34 is projected as a part of the periphery of a light distribution pattern formed at the front area of the vehicle 10.

The left rotary shade 46 includes a first end 46a. The first end 46a is disposed at the left end of the left rotary shade 46. The first end 46a includes an axial hole formed coaxially with the rotary axis A3. The axial hole is coupled with the shade driving mechanism 37.

The left rotary shade 46 includes a second end 46b. The second end 46a is disposed at the right end of the left rotary shade 46. The second end 46b includes an axial hole formed coaxially with the rotary axis A3. The axial hole is coupled with the support 38.

The left rotary shade 46 includes a first peripheral surface 46c. The first peripheral surface 46c is disposed at the left side of the second end 46b. The first peripheral surface 46c extends in the left and right directions of the left rotary shade 46 to be parallel to the rotary axis A3. The first peripheral surface 46c extends concentrically around the rotary axis A3. That is, a distance between the first peripheral surface 46c and the rotary axis A3 is fixed.

The left rotary shade 46 includes a second peripheral surface 46d. The second peripheral surface 46d is disposed at the left side of the first peripheral surface 46c. The second peripheral surface 46d extends in the left and right directions of the left rotary shade 46 to be parallel to the rotary axis A3. The second peripheral surface 46d extends concentrically around the rotary axis A3. That is, a distance between the second peripheral surface 46d and the rotary axis A3 is fixed. Also, the distance between the second peripheral surface 46d and the rotary axis A3 is larger than the distance between the first peripheral surface 46c and the rotary axis A3.

The left rotary shade 46 includes a third peripheral surface 46e. The third peripheral surface 46e extends to connect the first peripheral surface 46c to the second peripheral surface 46d. The third peripheral surface 46e forms a slope surface extending in a direction not parallel to the rotary axis A3.

The left rotary shade 46 includes a fourth peripheral surface 46f. The fourth peripheral surface 46f extends to connect the second end 46b to the first peripheral surface 46c. The fourth peripheral surface 46f extends in the left and right directions of the left rotary shade 46 to be parallel to the rotary axis A3. The fourth peripheral surface 46f extends non-concentrically around the rotary axis A3. That is, a distance between the fourth peripheral surface 46f and the rotary axis A3 varies according to a rotation angle on the rotary axis A3 of the left rotary shade 46.

FIG. 9E illustrates the exterior of the left rotary shade 46 when viewed from the opposite direction to that of FIG. 7. The left rotary shade 46 includes a first flat surface 46g. The first flat surface 46g extends in the left and right directions of the left rotary shade 46 to be parallel to the rotary axis A3. The first flat surface 46g is continued to one circumferential end of the first peripheral surface 46c, one circumferential end of the second peripheral surface 46d, one circumferential end of the third peripheral surface 46e, and one circumferential end of the fourth peripheral surface 46f.

The left rotary shade 46 includes a second flat surface 46h. The second flat surface 46h extends in the left and right directions of the left rotary shade 46 to be parallel to the rotary axis A3. The other circumferential end of the first peripheral surface 46c is continued to the second flat surface 46h.

As illustrated in FIGS. 7 and 9E, the left rotary shade 46 includes a twist end surface 46i extending around the rotary axis A3. The twist end surface 46i includes a first portion 46i1 and a second portion 46i2. The first portion 46i1 extends to connect the first peripheral surface 46c to the fourth peripheral surface 46f. The second portion 46i2 extends to connect the first portion 46i1 to the second flat surface 46h. The first portion 46i1 and the second portion 46i2 are separated from each other by a boundary edge 46i3.

One circumferential end of the twist end surface 46i is continued to the first flat surface 46g. The other circumferential end of the twist end surface 46i is continued to the second flat surface 46h. The position of the twist end surface 46i continued to the first flat surface 46g and the position of the twist end surface 46i continued to the second flat surface 46h are different from each other with respect to the direction of the rotary axis A3. That is, the projection position of one circumferential end of the twist end surface 46i on the rotary axis A3 is different from the projection position of the other circumferential end of the twist end surface 46i on the rotary axis A3.

Figure 8A:
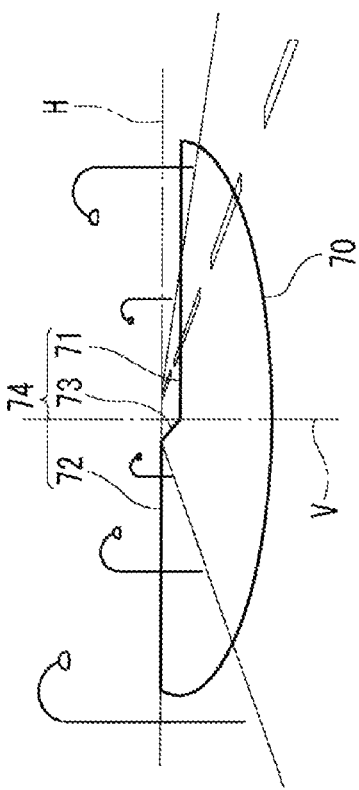
FIGS. 8A to 8D are views illustrating the relationship between a rotation angle position of the left rotary shade and a formed light distribution pattern.

FIG. 8A illustrates the left rotary shade 46 rotated by 180° from the state corresponding to FIG. 3B in the front view of the vehicle 10. Here, at the upper side of the rotary axis A3, edges formed by the first peripheral surface 46c, the second peripheral surface 46d, and the third peripheral surface 46e are disposed near the rear focus F of the projection lens 34. An edge 46c1 formed by the first peripheral surface 46c is disposed at the left side of the optical axis A1 (e.g., corresponding to the intersection of a horizontal reference line H and a vertical reference line V) of the projection lens 34 in the front view of the vehicle 10 to extend in parallel to the rotary axis A3. An edge 46d1 formed by the second peripheral surface 46d is disposed at the right side of the optical axis A1 in the front view of the vehicle 10 to extend in parallel to the rotary axis A3. An edge 46e1 formed by the third peripheral surface 46e is disposed at the left side of the optical axis A1 in the front view of the vehicle 10 to extend diagonally with respect to the rotary axis A3 and to connect the edge 46c1 to the edge 46d1.

Figure 8B:
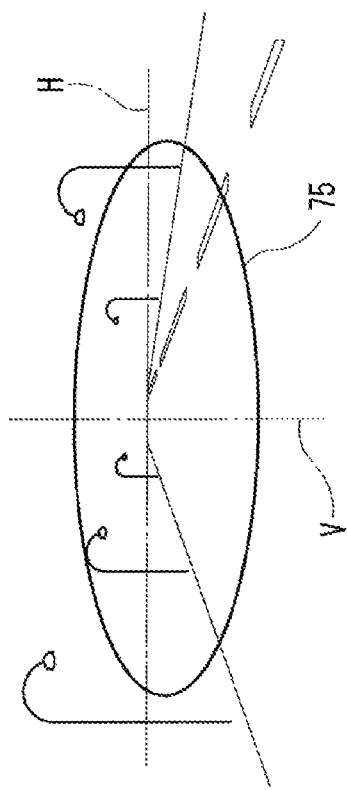

FIG. 8B illustrates a light distribution pattern formed when the edges 46c1, 46d1, and 46e1 are projected to a virtual vertical screen disposed at the front area of the vehicle 10. The light distribution pattern corresponds to a left low beam pattern 70 (e.g., a first light distribution pattern). The left low beam pattern 70 is a light distribution pattern which is illuminated at the near front area of the vehicle 10 without giving a glare to an oncoming vehicle.

The left low beam pattern 70 includes a first horizontal cutoff line 71, a second horizontal cutoff line 72, and a slope cutoff line 73 on the upper edge thereof. In the following description, the first horizontal cutoff line 71, the second horizontal cutoff line 72, and the slope cutoff line 73 are collectively referred to as "a left horizontal cutoff line 74" as necessary.

The first horizontal cutoff line 71 is formed by the edge 46d1. The first horizontal cutoff line 71 extends in parallel to the horizontal reference line H at the right side of the vertical reference line V and at the lower side of the horizontal reference line H, and is used as an oncoming lane-side cutoff line. The second horizontal cutoff line 72 is formed by the edge 46c1. The second horizontal cutoff line 72 extends along the horizontal reference line H at the left side of the vertical reference line V, and is used as an own lane-side cutoff line. The slope cutoff line 73 is formed by the edge 46e1. The slope cutoff line 73 extends diagonally from the left end of the first horizontal cutoff line 71 toward the left upper side, and is connected to the right end of the second horizontal cutoff line 72.

That is, when the shade driving mechanism 37 (e.g., a second driving mechanism) rotates the left rotary shade 46 to the position illustrated in FIG. 8A (e.g., a first angle position), the edges 46c1, 46d1, and 46e1 (an example of a first edge of the rotary shade) are projected to the front area of the projection lens 34 as the left horizontal cutoff line 74 (e.g., a periphery of the first light distribution pattern). The light passing through the upper side of the edges 46c1, 46d1, and 46e1 illuminates the lower side of the left horizontal cutoff line 74.

Figure 8C:
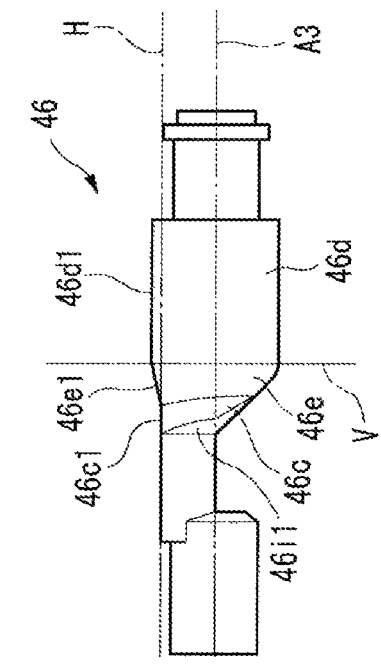

FIG. 8C illustrates the left rotary shade 46 rotated clockwise by 90° from the state illustrated in FIG. 8A when viewed from the right side in the front view of the vehicle 10. Here, a space 46j is defined by the first flat surface 46g and the second flat surface 46h at the upper side of the rotary axis A3.

Figure 8D:
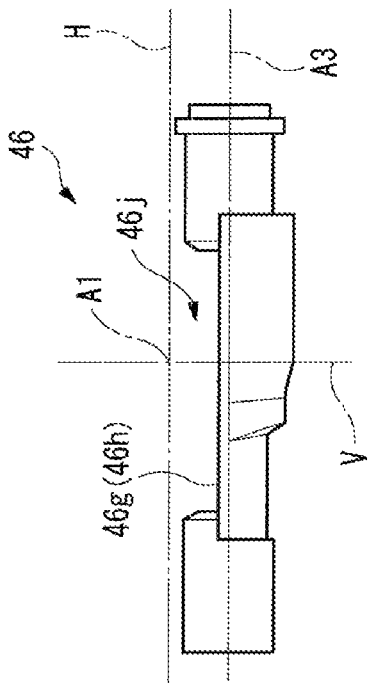

The space 46j includes the optical axis A1 of the projection lens 34. Thus, the light emitted from the light source 31 and reflected by the reflector 33 is not blocked but passes through the space 46j and the projection lens 34 to form a left high beam pattern 75 at the front area of the vehicle 10 as illustrated in FIG. 8D. The left high beam pattern 75 is a light distribution pattern which is illuminated in a wide range ahead of the vehicle 10 to the far side.

FIG. 9A illustrates the left rotary shade 46 rotated counterclockwise by 90° from the state illustrated in FIG. 8A when viewed from the right side, in the front view of the vehicle 10. Here, at the upper side of the rotary axis A3, edges 46c2, 46d2, and 46e2 formed by the first peripheral surface 46c, the second peripheral surface 46d, and the third peripheral surface 46e, respectively, and the boundary edge 46i3 of the twist end surface 46i are disposed near the rear focus F of the projection lens 34. The edge 46c2 formed by the first peripheral surface 46c is disposed at the left side of the optical axis A1 of the projection lens 34 in the front view of the vehicle 10 to extend in parallel to the rotary axis A3. The edge 46d2 formed by the second peripheral surface 46d is disposed at the right side of the optical axis A1 in the front view of the vehicle 10 to extend in parallel to the rotary axis A3. The edge 46e2 formed by the third peripheral surface 46e is disposed at the left side of the optical axis A1 in the front view of the vehicle 10, and extends diagonally with respect to the rotary axis A3 to connect the edge 46c2 to the edge 46d2. The boundary edge 46i3 of the twist end surface 46i is disposed at the left side of the optical axis A1 in the front view of the vehicle 10, and extends diagonally with respect to the rotary axis A3. A space 46k1 is defined at the left side of the boundary edge 46i3.

FIG. 9B illustrates a light distribution pattern formed when the edges 46c2, 46d2, 46e2, and 46i3 are projected to the virtual vertical screen disposed at the front area of the vehicle 10. The light distribution pattern corresponds to a partial left high beam pattern 80 (e.g., a second light distribution pattern). The partial left high beam pattern 80 has an illumination area larger than the left low beam pattern 70 and smaller than the left high beam pattern 75.

The partial left high beam pattern 80 includes a horizontal cutoff line 81 and a vertical cutoff line 82. The horizontal cutoff line 81 (e.g., a first periphery of the second light distribution pattern) is formed by the edges 46c2, 46d2, and 46e2 (e.g., a second edge of the rotary shade). The horizontal cutoff line 81 extends along the horizontal reference line H. The vertical cutoff line 82 (an example of a second periphery of the second light distribution pattern) is formed by the boundary edge 46i3 (e.g., the edge of the twist end surface) of the twist end surface 46i. The vertical cutoff line 82 extends diagonally from the left end of the horizontal cutoff line 81 toward the left upper side.

That is, when the shade driving mechanism 37 rotates the left rotary shade 46 to the position illustrated in FIG. 9A (e.g., a second angle position), the edges 46c2, 46d2, and 46e2 are projected to the front area of the projection lens 34 as the horizontal cutoff line 81, and the boundary edge 46i3 is projected to the front area of the projection lens 34 as the vertical cutoff line 82. The light passing through the upper side of the edges 46c2, 46d2, and 46e2 illuminates the lower side of the horizontal cutoff line 81. The light passing through the space 46k1 illuminates the left side of the vertical cutoff line 82. The use of the partial left high beam pattern 80 will be described later.

FIG. 9C illustrates the left rotary shade 46 rotated counterclockwise by 45° from the state illustrated in FIG. 9A when viewed from the right side, in the front view of the vehicle 10. Here, at the upper side of the rotary axis A3, edges 46d3 and 46e3 formed by the second peripheral surface 46d, and the third peripheral surface 46e, respectively, and an outer peripheral edge 46i4 of the second portion 46i2 of the twist end surface 46i are disposed near the rear focus F of the projection lens 34. The edge 46d3 formed by the second peripheral surface 46d is disposed at the right side of the optical axis A1 in the front view of the vehicle 10 to extend in parallel to the rotary axis A3. The edge 46e3 formed by the third peripheral surface 46e is disposed at the left side of the optical axis A1 in the front view of the vehicle 10 to extend diagonally with respect to the rotary axis A3 to connect the edge 46c3 to the edge 46d3. The outer peripheral edge 46i4 of the second portion 46i2 of the twist end surface 46i is disposed at the left side of the optical axis A1 in the front view of the vehicle 10 to extend diagonally with respect to the rotary axis A3. A space 46k2 is defined at the left side of the outer peripheral edge 46i4.

FIG. 9D illustrates a light distribution pattern formed when the edges 46d3, and 46e3 and the outer peripheral edge 46i4 are projected to the virtual vertical screen disposed at the front area of the vehicle 10. The light distribution pattern is also an example of the partial left high beam pattern 80. The horizontal cutoff line 81 is formed by the edges 46d3, and 46e3 (e.g., the second edge of the rotary shade), and the vertical cutoff line 82 is formed by the outer peripheral edge 46i4 (e.g., the edge of the twist end surface).

That is, when the shade driving mechanism 37 rotates the left rotary shade 46 to the position illustrated in FIG. 9C (e.g., the second angle position), the edges 46d3 and 46e3 are projected to the front area of the projection lens 34 as the horizontal cutoff line 81, and the outer peripheral edge 46i4 is projected to the front area of the projection lens 34 as the vertical cutoff line 82. The light passing through the upper side of the edges 46d3 and 46e3 illuminates the lower side of the horizontal cutoff line 81. The light passing through the space 46k2 illuminates the left side of the vertical cutoff line 82. In comparison to the state illustrated in FIG. 9B, the vertical cutoff line 82 is closer to the vertical reference line V, and the left illumination area of the vertical cutoff line 82 is wider.

FIG. 9E illustrates the left rotary shade 46 rotated counterclockwise by 45° from the state illustrated in FIG. 9C when viewed from the right side, in the front view of the vehicle 10. Here, at the upper side of the rotary axis A3, an edge 46d4 formed by the second peripheral surface 46d and an outer peripheral edge 46i5 of the second portion 46i2 of the twist end surface 46i are disposed near the rear focus F of the projection lens 34. The edge 46d4 formed by the second peripheral surface 46d is disposed at the right side of the optical axis A1 of the projection lens 34 in the front view of the vehicle 10 to extend in parallel to the rotary axis A3. The outer peripheral edge 46i5 of the second portion 46i2 of the twist end surface 46i extends diagonally with respect to the rotary axis A3 across the vertical reference line V. A space 46k3 is defined at the left side of the outer peripheral edge 46i5.

FIG. 9F illustrates a light distribution pattern formed when the edge 46d4 and the outer peripheral edge 46i5 are projected to the virtual vertical screen disposed at the front area of the vehicle 10. The light distribution pattern is also an example of the partial left high beam pattern 80. The horizontal cutoff line 81 is formed by the edge 46d4 and the vertical cutoff line 82 is formed by the outer peripheral edge 46i5.

That is, when the shade driving mechanism 37 rotates the left rotary shade 46 to the position illustrated in FIG. 9E (e.g., the second angle position), the edge 46d4 (e.g., the second edge of the rotary shade) is projected to the front area of the projection lens 34 as the horizontal cutoff line 81, and the outer peripheral edge 46i5 (e.g., the edge of the twist end surface) is projected to the front area of the projection lens 34 as the vertical cutoff line 82. The light passing through the upper side of the edge 46d4 illuminates the lower side of the horizontal cutoff line 81. The light passing through the space 46k3 illuminates the left side of the vertical cutoff line 82. In comparison to the state illustrated in FIG. 9D, the vertical cutoff line 82 is closer to the vertical reference line V, and the left illumination area of the vertical cutoff line 82 is wider.

When the shade driving mechanism 37 rotates the left rotary shade 46 between the positions illustrated in FIGS. 9A and 9E, a part of the twist end surface 46i projected as the vertical cutoff line 82 of the partial left high beam pattern 80 is displaced in the left and right directions of the left rotary shade 46. Since the twist end surface 46i continuously extends around the rotary axis A3, the position of the vertical cutoff line 82 may be continuously changed in the left and right directions.

As described above, the left rotary shade 46 includes the second peripheral surface 46d extending concentrically around the rotary axis A3. Accordingly, the vertical position of the edges 46d1 to 46d4 to be projected to the front area is not changed according to the rotation of the left rotary shade 46. Accordingly, the position of the projection image of the edge (e.g., the first horizontal cutoff line 71 and the horizontal cutoff line 81) is not changed according to the switching between the left low beam pattern 70 and the partial left high beam pattern 80, and the displacement of the vertical cutoff line 82 in the partial left high beam pattern 80. Accordingly, when the light distribution pattern is changed, an uncomfortable feeling of a driver may be suppressed.

As illustrated in FIG. 3A, the right lamp unit 30R includes a swivel actuator 39. The swivel actuator 39 is configured to rotate at least a part of the right lamp unit 30R in the left and right directions on the rotary axis A4 to change the optical axis A1 direction of the projection lens 34 in the left and right directions of the right lamp unit 30R. The rotary axis A4 extends in the vertical direction of the right lamp unit 30R through the rear focus F of the projection lens 34. Although not illustrated, the left lamp unit 30L has the same configuration. The use of the swivel actuator 39 will be described later in detail.

Figure 10:
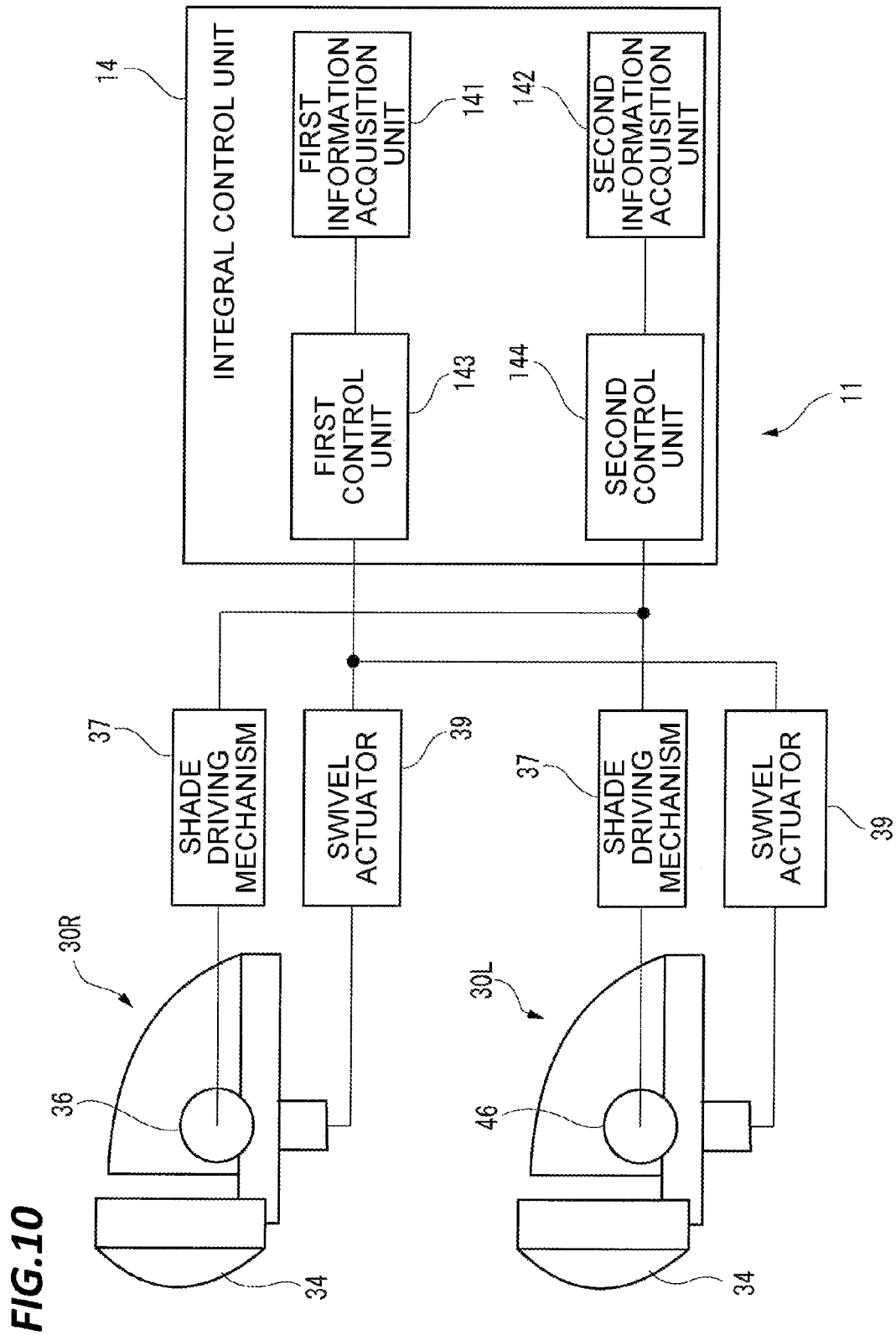
FIG. 10 is a view schematically illustrating a control configuration of the headlight control system.

FIG. 10 is a view schematically illustrating a functional configuration of the integral control unit 14 provided in the headlight control system 11 according to the present exemplary embodiment. The integral control unit 14 includes a first information acquisition unit 141 and a second information acquisition unit 142.

The first information acquisition unit 141 is configured to acquire information on a rudder angle of the vehicle 10 (e.g., first information). The first information may be acquired based on the signal input from the wheel speed sensors 16 and the steering angle sensor 17 illustrated in FIG. 1. The image on the front area of the vehicle 10, which is obtained from the camera 18, may be used for determining the rudder angle. Besides or instead of them, information obtained through a navigation system, an inter-vehicle communication unit, and a road-to-vehicle communication unit (which are not illustrated) may be used to determine the rudder angle.

The second information acquisition unit 142 is configured to acquire information on a front area of the vehicle 10 (e.g., second information). The second information includes the presence or absence of, for example, an oncoming vehicle or a pedestrian on the front area of the vehicle 10. The second information may be acquired based on the signal input from the camera 18 illustrated in FIG. 1. Besides or instead of them, information obtained through a navigation system, an inter-vehicle communication unit, and a road-to-vehicle communication unit (which are not illustrated) may be used to acquire the front area information.

The integral control unit 14 includes a first control unit 143. The first control unit 143 is functionally connected to the first information acquisition unit 141. The first control unit 143 is connected to communicate the swivel actuator 39 (e.g., a first driving mechanism) provided in each of the right lamp unit 30R and the left lamp unit 30L. The first control unit 143 controls the swivel actuator 39 to determine the direction of the optical axis A1 of each projection lens 34 based on rudder angle information of the vehicle 10 acquired by the first information acquisition unit 141.

The integral control unit 14 includes a second control unit 144. The second control unit 144 is functionally connected to the second information acquisition unit 142. The second control unit 144 is connected to communicate the shade driving mechanism 37 (e.g., a second driving mechanism) provided in each of the right lamp unit 30R and the left lamp unit 30L. The second control unit 144 controls each shade driving mechanism 37 to determine the positions of the vertical cutoff line 62 of the partial right high beam pattern 60 and the vertical cutoff line 82 of the partial left high beam pattern 80 with respect to the direction of the optical axis A1 determined by the first control unit 143, based on front area information of the vehicle 10 acquired by the second information acquisition unit 142.

Figure 11A:
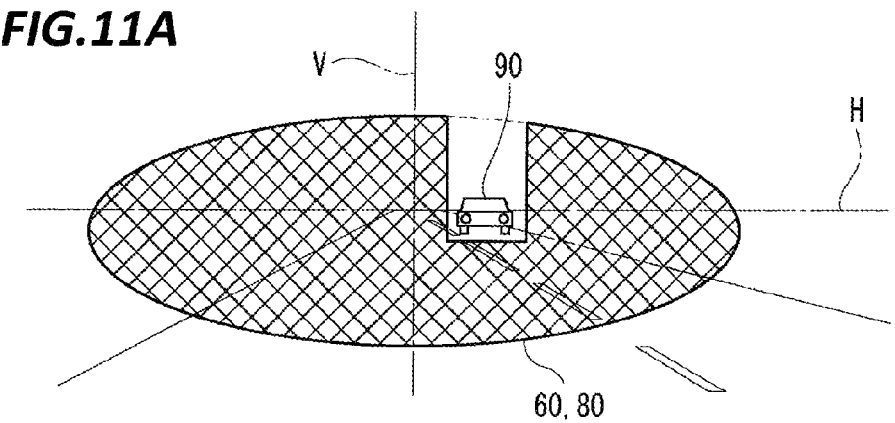
FIGS. 11A to 11C are views illustrating an ADB control and a swivel control performed by the headlight control system of FIG. 10.

FIG. 11A is a schematic view illustrating an ADB control using the partial right high beam pattern 60 and the partial left high beam pattern 80. The second control unit 144 performs a control such that the light distribution is switched to the partial right high beam pattern 60 and the partial left high beam pattern 80 when the information indicating the presence of an oncoming vehicle 90 on the front area of the vehicle 10 is acquired from the second information acquisition unit 142 during execution of the high beam light distribution.

Specifically, the second control unit 144 controls the shade driving mechanism 37 provided in each of the right lamp unit 30R and the left lamp unit 30L to rotate the right rotary shade 36 and the left rotary shade 46. More specifically, the rotation angle position of each of the right rotary shade 36 and the left rotary shade 46 is determined such that the vertical cutoff line 62 of the partial right high beam pattern 60 is disposed at the right side of the oncoming vehicle 90, and the vertical cutoff line 82 of the partial left high beam pattern 80 is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

Figure 11B:
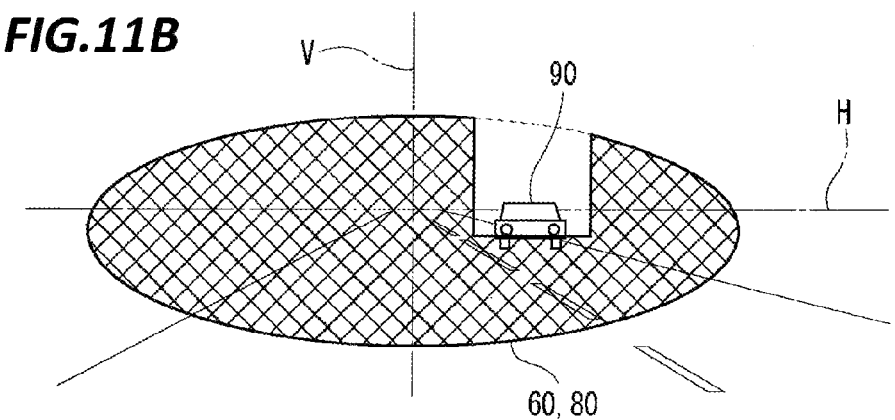

When the relative position between the vehicle 10 and the oncoming vehicle 90 is changed as illustrated in FIG. 11B, the above described fact is detected by the second information acquisition unit 142. The second control unit 144 controls each shade driving mechanism 37 to rotate the right rotary shade 36 and the left rotary shade 46 such that the vertical cutoff line 62 is continuously disposed at the right side of the oncoming vehicle 90, and the vertical cutoff line 82 is continuously disposed at the left side of the oncoming vehicle 90. Accordingly, a non-lighting region is formed to continuously include the oncoming vehicle 90.

Figure 11C:
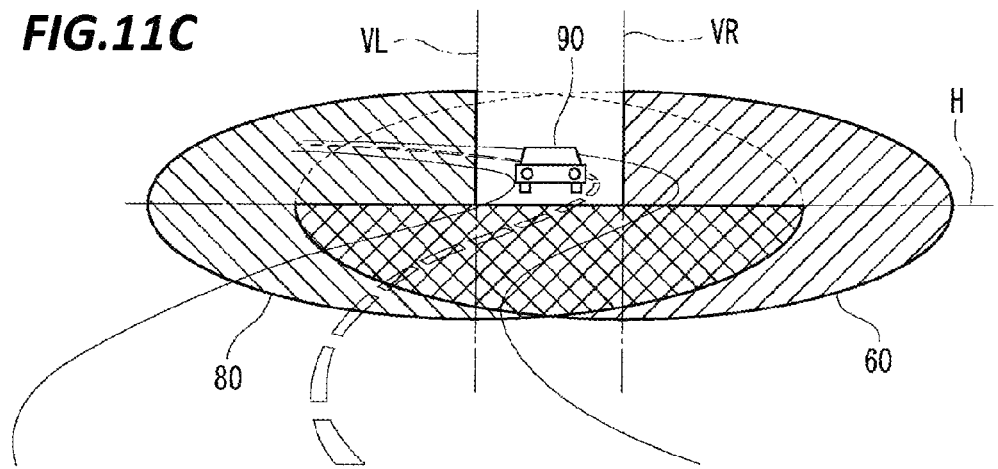

FIG. 11C is a schematic view illustrating a swivel control using the swivel actuator 39. Under the swivel control, the optical axis A1 direction of each projection lens 34 (e.g., corresponding to the intersection of the horizontal reference line H and each of the vertical reference lines VR and VL) is changed to correspond to the traveling direction of the vehicle 10 according to the rudder angle of the vehicle 10, so that the traveling direction is illuminated during traveling even on a curved path. In the example of FIG. 11C, the vehicle 10 is traveling on a rightward curved path.

The first information acquisition unit 141 calculates the rudder angle of the vehicle 10, that is, the traveling direction, based on the input from, for example, the wheel speed sensors 16 and the steering angle sensor 17. The first control unit 143 determines a proper direction of the optical axis A1 of each projection lens 34 based on the rudder angle calculated by the first information acquisition unit 141. The first control unit 143 determines an operation amount of each swivel actuator 39 based on the determined direction of the optical axis A1. In the example illustrated in FIG. 11C, the vehicle 10 is determined to be steered to the right. Accordingly, the operation of each swivel actuator 39 is controlled such that the optical axis A1 direction of each projection lens 34 is changed to the right. The vertical reference line VR of the right lamp unit 30R and the vertical reference line VL of the left lamp unit 30L are moved to the right from the state illustrated in FIG. 11B.

The light distribution patterns as targets of the swivel control may include all of the right low beam pattern 50, the right high beam pattern 55, the partial right high beam pattern 60, the left low beam pattern 70, the left high beam pattern 75, and the partial left high beam pattern 80 as described above. In the example illustrated in FIG. 11C, the targets are the partial right high beam pattern 60 and the partial left high beam pattern 80. The variation of the optical axis A1 direction of the projection lens 34 provided in the right lamp unit 30R may be equal to or different from the variation of the optical axis A1 direction of the projection lens 34 provided in the left lamp unit 30L. In the example illustrated in FIG. 11C, the right lamp unit 30R and the left lamp unit 30L have different variations.

The second control unit 144 performs an ADB control such that the light distribution is switched to the partial right high beam pattern 60 and the partial left high beam pattern 80 when the information indicating the presence of the oncoming vehicle 90 on the front area of the vehicle 10 is acquired from the second information acquisition unit 142 during execution of the swivel control. That is, the rotation angle position of each of the right rotary shade 36 and the left rotary shade 46 is determined such that the vertical cutoff line 62 of the partial right high beam pattern 60 is disposed at the right side of the oncoming vehicle 90, and the vertical cutoff line 82 of the partial left high beam pattern 80 is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

In the configuration of the present exemplary embodiment, since the swivel control is not affected by the ADB control, the optical axis A1 direction of the projection lens 34 may be always optimized. Thus, the highest illuminance portion in each of the partial right high beam pattern 60 and the partial left high beam pattern 80 (e.g., the central portion of each pattern) is disposed at a proper position with respect to the traveling direction of the vehicle 10. Accordingly, the visibility of the vehicle traveling direction is ensured. Since the ADB control is performed using the twist end surface 36*i* of the right rotary shade 36 and the twist end surface 46*i* of the left rotary shade 46, the position of each of the vertical cutoff lines 62 and 82 may be continuously varied. Accordingly, it is possible to suppress a glare on an oncoming vehicle while suppressing a driver from having an uncomfortable feeling due to a change of the light distribution pattern shape. Since the swivel control based on the rudder angle information of the vehicle 10 and the ADB control based on the front area information of the vehicle 10 are executed independently from each other, a complicated control design on the assumption of coordination of both controls is not required. Accordingly, it is possible to achieve both the suppression of a glare on an oncoming vehicle and the ensuring of the visibility of the vehicle traveling direction while suppressing an increase of a control load.

Also, in the configuration of the present exemplary embodiment, the second control unit 144 controls each shade driving mechanism 37 to determine the positions of the vertical cutoff lines 62 and 82 with respect to the optical axis A1 direction of each projection lens 34 determined by the first control unit 143.

A lateral displacement amount of the entire light distribution pattern varied by the swivel control is larger than a lateral displacement amount of the vertical cutoff line varied by the rotary shade through the ADB control. First, the optical axis A1 direction of each projection lens 34 is determined by the swivel control (e.g., including a case where an initial direction at straight traveling is maintained), and the ADB control is executed based on the direction so that the range of the vertical cutoff line displaceable by the rotary shade may be substantially widened. That is, an acting range of a glare suppressing effect may be widened without affecting the ensuring of the visibility of a vehicle traveling direction through the swivel control. Accordingly, it is possible to achieve both the suppression of a glare on an oncoming vehicle and the ensuring of the visibility of the vehicle traveling direction while suppressing an increase of a control load.

In the first exemplary embodiment described above, the light source 31 and the projection lens 34 for forming the low beam pattern are also used to form the high beam pattern or the partial high beam pattern. However, the light source and the projection lens for forming the high beam pattern or the partial high beam pattern may be provided independently from the light source and the projection lens for forming the low beam pattern. Such a configuration will be described as a second exemplary embodiment of the present disclosure.

Figure 12:
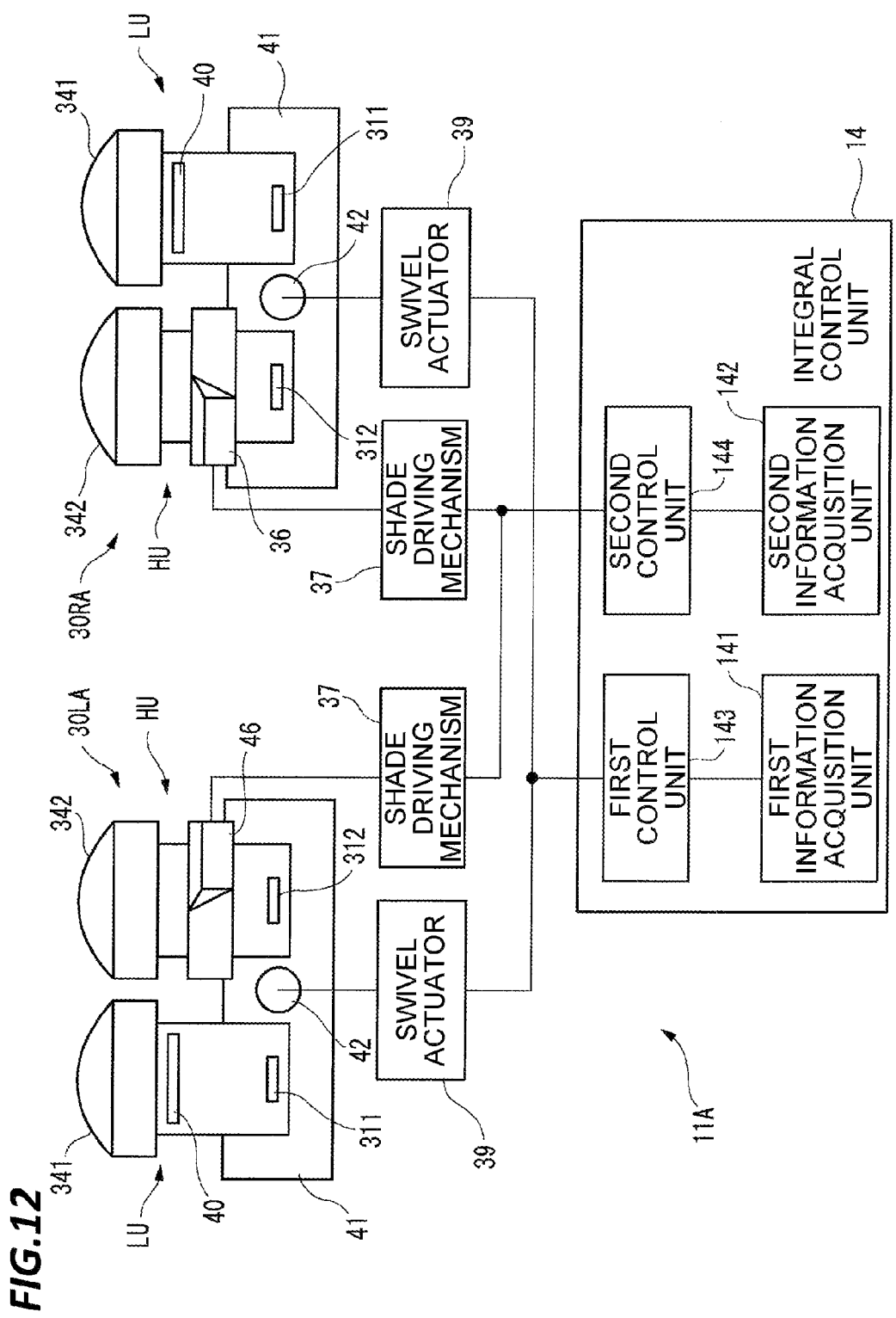
FIG. 12 is a view schematically illustrating a control configuration of the headlight control system according to a second exemplary embodiment of the present disclosure.

FIG. 12 is a view schematically illustrating the functional configuration of a headlight control system 11A according to the second exemplary embodiment of the present disclosure. Some elements having substantially the same configuration and functions as those in the headlight control system 11 according to the first exemplary embodiment are given the same reference numerals, and repetitive descriptions thereof will be omitted.

The headlight control system 11A includes a right lamp unit 30RA and a left lamp unit 30LA. Each of the right lamp unit 30RA and the left lamp unit 30LA includes a low beam unit LU and a high beam unit HU. Each low beam unit LU includes a first light source 311, a first projection lens 341, and a shade 40. Each high beam unit HU includes a second light source 312 and a second projection lens 342. The high beam unit HU of the right lamp unit 30RA includes a right rotary shade 36.

The high beam unit HU of the left lamp unit 30LA includes a left rotary shade 46.

A part of the light emitted from the first light source 311 of the right lamp unit 30RA is blocked by the shade 40. The first projection lens 341 of the right lamp unit 30RA is disposed such that the edge of the shade 40 is projected to the front area by the light emitted from the first light source 311 to form a right low beam pattern 50A (see, e.g., FIGS. 13A to 13C).

A part of the light emitted from the second light source 312 of the right lamp unit 30RA is blocked by the right rotary shade 36. The second projection lens 342 of the right lamp unit 30RA is disposed such that the edge is projected according to the rotation angle position of the right rotary shade 36 to the front area by the light emitted from the second light source 312 to form a partial right high beam pattern 60A (see, e.g., FIGS. 13A to 13C). Also, the right high beam pattern as illustrated in FIG. 5D may be formed according to the rotation angle position of the right rotary shade 36.

A part of the light emitted from the first light source 311 of the left lamp unit 30LA is blocked by the shade 40. The first projection lens 341 of the left lamp unit 30LA is disposed such that the edge of the shade 40 is projected to the front area by the light emitted from the first light source 311 to form a left low beam pattern 70A (see, e.g., FIGS. 13A to 13C).

A part of the light emitted from the second light source 312 of the left lamp unit 30LA is blocked by the left rotary shade 46. The second projection lens 342 of the left lamp unit 30LA is disposed such that the edge is projected according to the rotation angle position of the left rotary shade 46 to the front area by the light emitted from the second light source 312 to form a partial left high beam pattern 80A (see, e.g., FIGS. 13A to 13C). Also, the left high beam pattern as illustrated in FIG. 8D may be formed according to the rotation angle position of the left rotary shade 46.

In the right lamp unit 30RA, the low beam unit LU and the high beam unit HU are supported by a common base 41. The base 41 includes a rotary shaft 42. A swivel actuator 39 is mechanically connected to the rotary shaft 42. The swivel actuator 39 may rotate the base 41 on the rotary shaft 42. That is, the swivel actuator 39 (an example of a first driving mechanism) is configured to change the optical axis direction of the first projection lens 341 and the optical axis direction of the second projection lens 342 at once.

Figure 13A:
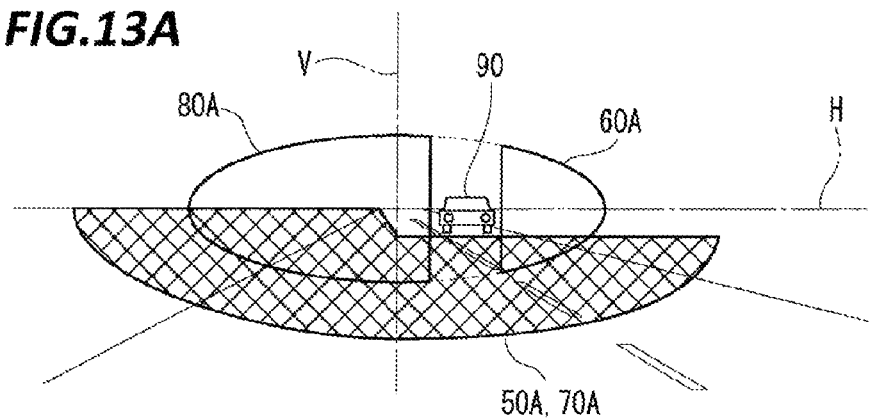
FIGS. 13A to 13C are views illustrating an ADB control and a swivel control performed by the headlight control system of FIG. 12.

FIG. 13A is a schematic view illustrating an ADB control using the partial right high beam pattern 60A and the partial left high beam pattern 80A. The second control unit 144 performs a control such that the light distribution is switched to the partial right high beam pattern 60A and the partial left high beam pattern 80A when the information indicating the presence of an oncoming vehicle 90 on the front area of the vehicle 10 is acquired from the second information acquisition unit 142 during execution of the high beam light distribution.

Specifically, the second control unit 144 controls the shade driving mechanism 37 provided in each of the right lamp unit 30RA and the left lamp unit 30LA to rotate the right rotary shade 36 and the left rotary shade 46. More specifically, the rotation angle position of each of the right rotary shade 36 and the left rotary shade 46 is determined such that the vertical cutoff line 62 of the partial right high beam pattern 60A is disposed at the right side of the oncoming vehicle 90, and the vertical cutoff line 82 of the partial left high beam pattern 80A is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

Figure 13B:
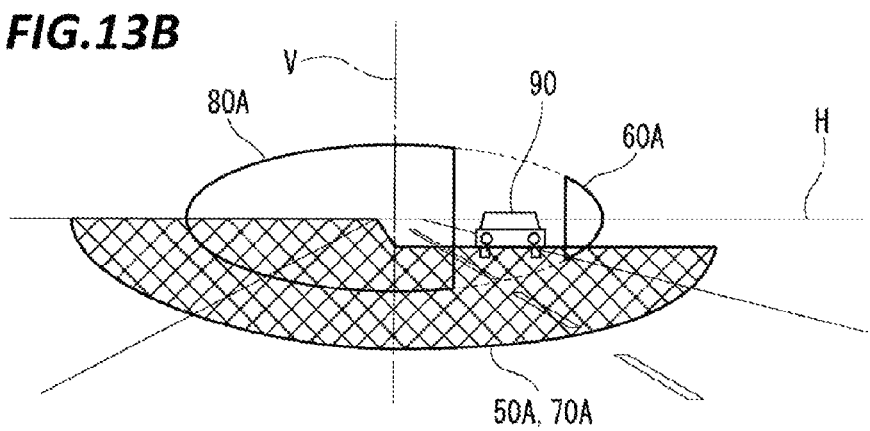

When the relative position between the vehicle 10 and the oncoming vehicle 90 is changed as illustrated in FIG. 13B, the above described fact is detected by the second information acquisition unit 142. The second control unit 144 controls each shade driving mechanism 37 to rotate the right rotary shade 36 and the left rotary shade 46 such that the vertical cutoff line 62 is continuously disposed at the right side of the oncoming vehicle 90, and the vertical cutoff line 82 is continuously disposed at the left side of the oncoming vehicle 90. Accordingly, a non-lighting region is formed to continuously include the oncoming vehicle 90.

Figure 13C:
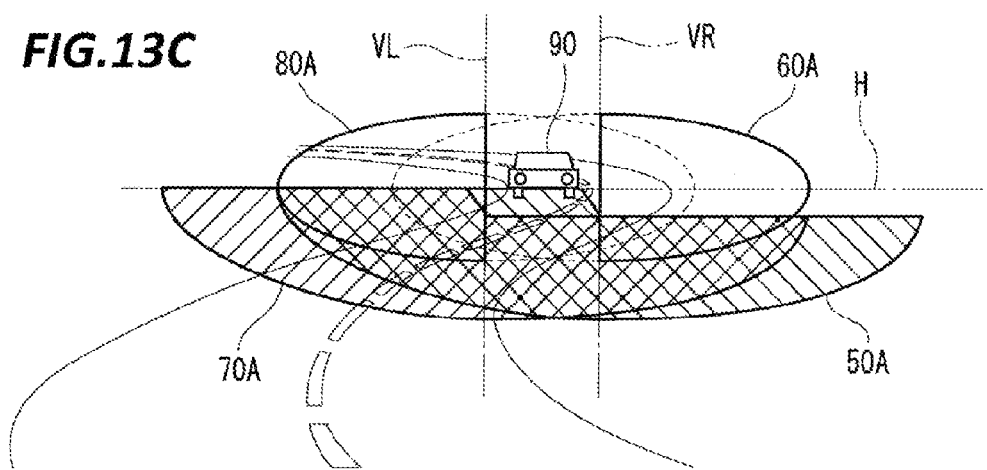

FIG. 13C is a schematic view illustrating a swivel control using the swivel actuator 39. Under the swivel control, the optical axis direction of each of the first projection lens 341 and the second projection lens 342 in each lamp unit (corresponding to the intersection of the horizontal reference line H and each of the vertical reference lines VR and VL) is changed to correspond to the traveling direction of the vehicle 10 according to the rudder angle of the vehicle 10, so that the traveling direction is illuminated during traveling even on a curved path. In the example of FIG. 13C, the vehicle 10 is traveling on a rightward curved path.

The first information acquisition unit 141 calculates the rudder angle of the vehicle 10, that is, the traveling direction, based on the input from, for example, the wheel speed sensors 16 and the steering angle sensor 17. The first control unit 143 determines a proper direction of the optical axis of each of the first projection lens 341 and the second projection lens 342 in each lamp unit based on the rudder angle calculated by the first information acquisition unit 141. The first control unit 143 determines an operation amount of each swivel actuator 39 based on the determined direction of the optical axis. In the example illustrated in FIG. 13C, the vehicle 10 is determined to be steered to the right. Accordingly, the operation of each swivel actuator 39 is controlled such that the optical axis direction of each of the first projection lens 341 and the second projection lens 342 in each lamp unit is changed to the right. The vertical reference line VR of the right lamp unit 30RA and the vertical reference line VL of the left lamp unit 30LA are moved to the right from the state illustrated in FIG. 13B. The variation of the optical axis direction of each of the first projection lens 341 and the second projection lens 342 provided in the right lamp unit 30RA may be equal to or different from the variation of the optical axis direction of each of the first projection lens 341 and the second projection lens 342 provided in the left lamp unit 30LA. In the example illustrated in FIG. 13C, the right lamp unit 30RA and the left lamp unit 30LA have different variations.

The second control unit 144 performs an ADB control such that the light distribution is switched to the partial right high beam pattern 60A and the partial left high beam pattern 80A when the information indicating the presence of the oncoming vehicle 90 on the front area of the vehicle 10 is acquired from the second information acquisition unit 142 during execution of the swivel control. That is, the rotation angle position of each of the right rotary shade 36 and the left rotary shade 46 is determined such that the vertical cutoff line 62 of the partial right high beam pattern 60A is disposed at the right side of the oncoming vehicle 90, and the vertical cutoff line 82 of the partial left high beam pattern 80A is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

As described above, in the configuration of the present exemplary embodiment, the swivel actuator 39 is configured to change the optical axis direction of the first projection lens 341 and the optical axis direction of the second projection lens 342 at once. Accordingly, even in the configuration where a light source and a projection lens for the low beam light distribution are independent from a light source and a projection lens for the high beam light distribution, the second control unit 144 may determine the position of each of the vertical cutoff lines 62 and 82 based on the optical axis direction of each of the first projection lens 341 and the second projection lens 342 in each lamp unit, the optical axis direction being determined by the first control unit 143. First, the optical axis direction of each of the first projection lens 341 and the second projection lens 342 in each lamp unit is determined by the swivel control (including a case where an initial direction at straight traveling is maintained), and the ADB control is executed based on the direction so that the range of the vertical cutoff line displaceable by the rotary shade may be substantially widened. That is, an acting range of a glare suppressing effect may be widened without affecting the ensuring of the visibility of a vehicle traveling direction through the swivel control. Accordingly, it is possible to achieve both the suppression of a glare on an oncoming vehicle and the ensuring of the visibility of the vehicle traveling direction while suppressing an increase of a control load.

In the first and second exemplary embodiments described above, both the low beam pattern and the high beam pattern (e.g., including the partial high beam pattern) are set as targets of the swivel control. However, only the low beam pattern may be set as a target of the swivel control. Such a configuration will be described as a third exemplary embodiment of the present disclosure.

Figure 14:
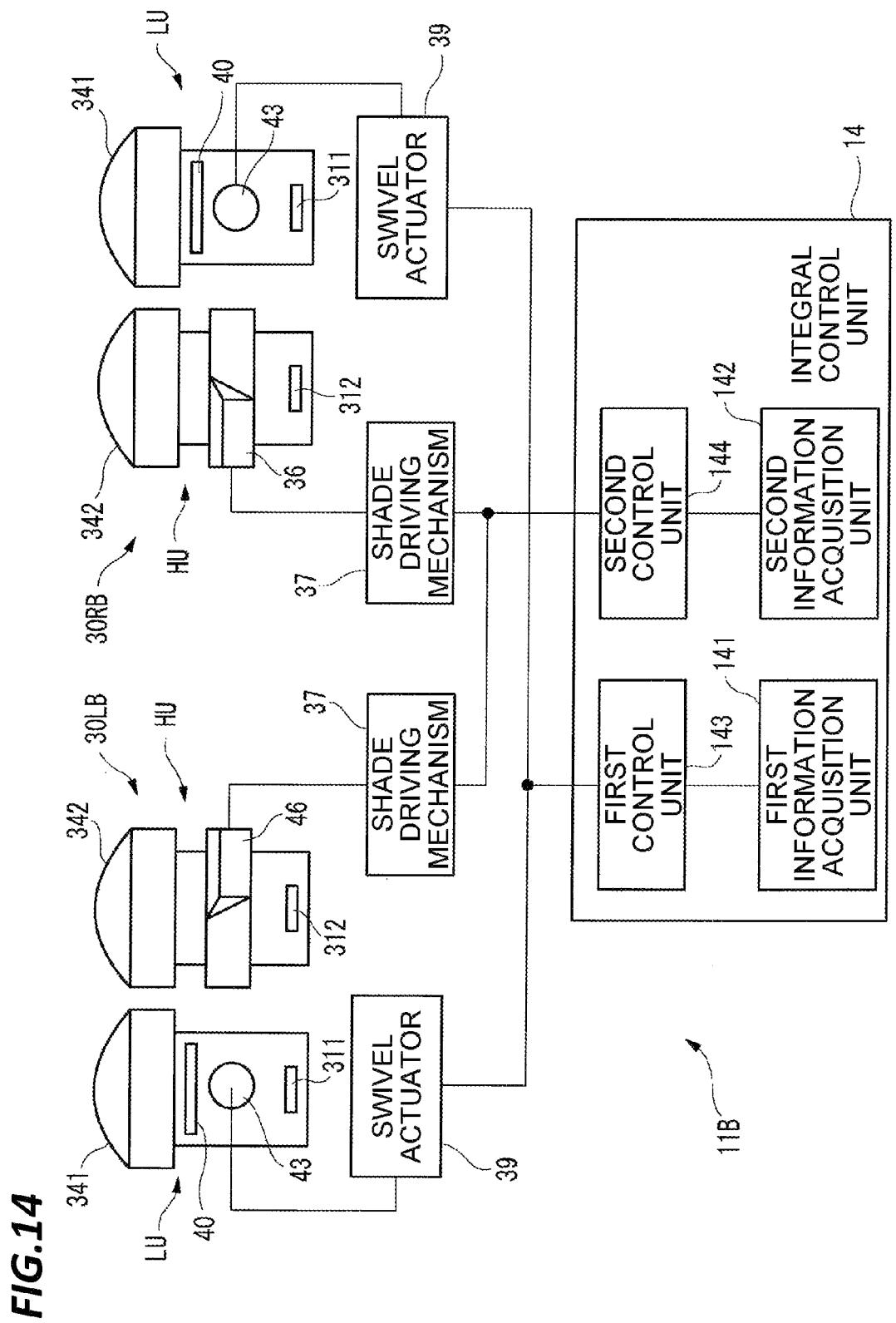
FIG. 14 is a view schematically illustrating a control configuration of the headlight control system according to a third exemplary embodiment of the present disclosure.

FIG. 14 is a view schematically illustrating the functional configuration of a headlight control system 11B according to the third exemplary embodiment of the present disclosure. Some elements having substantially the same configuration and functions as those in the headlight control system 11A according to the second exemplary embodiment are given the same reference numerals, and repetitive descriptions thereof will be omitted.

The headlight control system 11B includes a right lamp unit 30RB and a left lamp unit 30LB. Each of the right lamp unit 30RB and the left lamp unit 30LB includes a low beam unit LU and a high beam unit HU. Each low beam unit LU includes a first light source 311, a first projection lens 341, and a shade 40. Each high beam unit HU includes a second light source 312 and a second projection lens 342. The high beam unit HU of the right lamp unit 30RB includes a right rotary shade 36. The high beam unit HU of the left lamp unit 30LB includes a left rotary shade 46.

A part of the light emitted from the first light source 311 of the right lamp unit 30RB is blocked by the shade 40. The first projection lens 341 of the right lamp unit 30RB is disposed such that the edge of the shade 40 is projected to the front area by the light emitted from the first light source 311 to form a right low beam pattern 50B (see, e.g., FIGS. 15A to 15C).

A part of the light emitted from the second light source 312 of the right lamp unit 3ORB is blocked by the right rotary shade 36. The second projection lens 342 of the right lamp unit 3ORB is disposed such that the edge is projected according to the rotation angle position of the right rotary shade 36 to the front area by the light emitted from the second light source 312 to form a partial right high beam pattern 60B (see, e.g., FIGS. 15A to 15C). Also, the right high beam pattern as illustrated in FIG. 5D may be formed according to the rotation angle position of the right rotary shade 36.

A part of the light emitted from the first light source 311 of the left lamp unit 30LB is blocked by the shade 40. The first projection lens 341 of the left lamp unit 30LB is disposed such that the edge of the shade 40 is projected to the front area by the light emitted from the first light source 311 to form a left low beam pattern 70B (see, e.g., FIGS. 15A to 15C).

A part of the light emitted from the second light source 312 of the left lamp unit 30LB is blocked by the left rotary shade 46. The second projection lens 342 of the left lamp unit 30LB is disposed such that the edge is projected according to the rotation angle position of the left rotary shade 46 to the front area by the light emitted from the second light source 312 to form a partial left high beam pattern 80B (see, e.g., FIGS. 15A to 15C). Also, the left high beam pattern as illustrated in FIG. 8D may be formed according to the rotation angle position of the left rotary shade 46.

In the present exemplary embodiment, only the low beam unit LU is configured to be rotated on a rotary shaft 43. A swivel actuator 39 is connected to the rotary shaft 43. The swivel actuator 39 (e.g., the first driving mechanism) is configured to change the optical axis direction of the first projection lens 341 independently from the optical axis direction of the second projection lens 342.

Figure 15A:
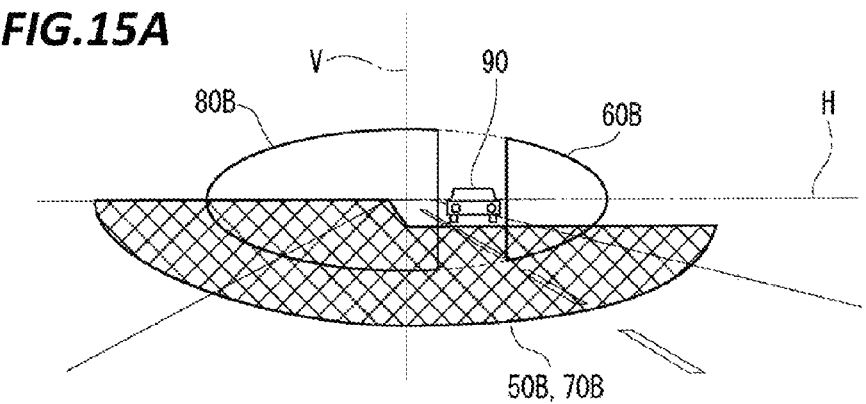
FIGS. 15A to 15C are views illustrating an ADB control and a swivel control performed by the headlight control system of FIG. 14.

FIG. 15A is a schematic view illustrating an ADB control using the partial right high beam pattern 60B and the partial left high beam pattern 80B. The second control unit 144 performs a control such that the light distribution is switched to the partial right high beam pattern 60B and the partial left high beam pattern 80B when the information indicating the presence of an oncoming vehicle 90 on the front area of the vehicle 10 is acquired from the second information acquisition unit 142 during execution of the high beam light distribution.

Specifically, the second control unit 144 controls the shade driving mechanism 37 provided in each of the right lamp unit 3ORB and the left lamp unit 30LB to rotate the right rotary shade 36 and the left rotary shade 46. More specifically, the rotation angle position of each of the right rotary shade 36 and the left rotary shade 46 is determined such that the vertical cutoff line 62 of the partial right high beam pattern 60B is disposed at the right side of the oncoming vehicle 90, and the vertical cutoff line 82 of the partial left high beam pattern 80B is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

Figure 15B:
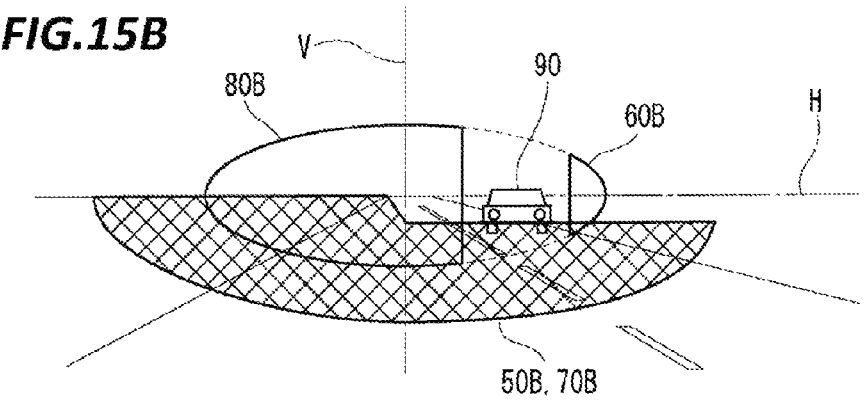

When the relative position between the vehicle 10 and the oncoming vehicle 90 is changed as illustrated in FIG. 15B, the above described fact is detected by the second information acquisition unit 142. The second control unit 144 controls each shade driving mechanism 37 to rotate the right rotary shade 36 and the left rotary shade 46 such that the vertical cutoff line 62 is continuously disposed at the right side of the oncoming vehicle 90, and the vertical cutoff line 82 is continuously disposed at the left side of the oncoming vehicle 90. Accordingly, a non-lighting region is formed to continuously include the oncoming vehicle 90.

Figure 15C:
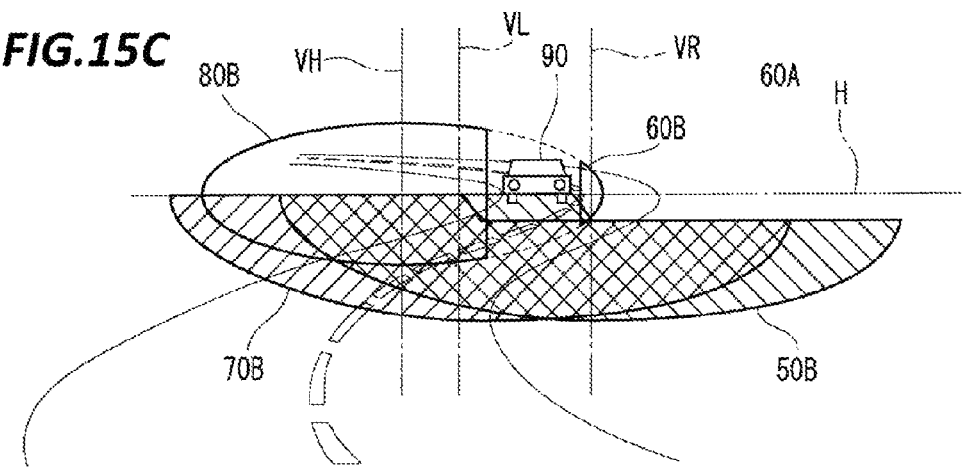

FIG. 15C is a schematic view illustrating a swivel control using the swivel actuator 39. Under the swivel control, the optical axis direction of the first projection lens 341 in each lamp unit (e.g., corresponding to the intersection of the horizontal reference line H and each of the vertical reference lines VR and VL) is changed to correspond to the traveling direction of the vehicle 10 according to the rudder angle of the vehicle 10, so that the traveling direction is illuminated during traveling even on a curved path. In the example of FIG. 15C, the vehicle 10 is traveling on a rightward curved path.

The first information acquisition unit 141 calculates the rudder angle of the vehicle 10, that is, the traveling direction, based on the input from, for example, the wheel speed sensors 16 and the steering angle sensor 17. The first control unit 143 determines a proper direction of the optical axis of the first projection lens 341 in each lamp unit based on the rudder angle calculated by the first information acquisition unit 141. The first control unit 143 determines an operation amount of each swivel actuator 39 based on the determined direction of the optical axis. In the example illustrated in FIG. 15C, the vehicle 10 is determined to be steered to the right. Accordingly, the operation of each swivel actuator 39 is controlled such that the optical axis direction of the first projection lens 341 in each lamp unit is changed to the right. Accordingly, the right low beam pattern 50B and the left low beam pattern 70B are moved to the right from the state illustrated in FIG. 15B.

In FIG. 15C, the vertical reference line VR of the right low beam pattern 50B and the vertical reference line VL of the left low beam pattern 70B are moved to the right from the state illustrated in FIG. 15B. The variation of the optical axis direction of the first projection lens 341 provided in the right lamp unit 30RB may be equal to or different from the variation of the optical axis direction of the first projection lens 341 provided in the left lamp unit 30LB. In the example illustrated in FIG. 15C, the right lamp unit 3ORB and the left lamp unit 30LB have different variations. The vertical reference line VH of each of the high beam patterns 55 and 75 is unchanged before and after the swivel control.

The second control unit 144 performs an ADB control such that the light distribution is switched to the partial right high beam pattern 60B and the partial left high beam pattern 80B when the information indicating the presence of the oncoming vehicle 90 on the front area of the vehicle 10 is acquired from the second information acquisition unit 142 during execution of the swivel control. That is, the rotation angle position of each of the right rotary shade 36 and the left rotary shade 46 is determined such that the vertical cutoff line 62 of the partial right high beam pattern 60B is disposed at the right side of the oncoming vehicle 90, and the vertical cutoff line 82 of the partial left high beam pattern 80B is disposed at the left side of the oncoming vehicle 90. Accordingly, the non-lighting region formed at the left side of the vertical cutoff line 62 and the non-lighting region formed at the right side of the vertical cutoff line 82 overlap each other to form a non-lighting region including the oncoming vehicle 90. Accordingly, a light distribution with an ensured front area visibility may be achieved while suppressing a glare on the oncoming vehicle 90.

As described above, according to the configuration of the present exemplary embodiment, the swivel actuator 39 is configured to change the optical axis direction of the first projection lens 341 independently from the optical axis direction of the second projection lens 342. Accordingly, the independence of each of the swivel control and the ADB control may be further improved. Since a complicated control design on the assumption of coordination of both controls is not required, it is possible to achieve both the suppression of a glare on an oncoming vehicle and the ensuring of the visibility of the vehicle traveling direction while suppressing an increase of a control load.

In the exemplary embodiments as described above, mainly in view of easy chromatic aberration correction, a semiconductor light emitting device is used as for the light source 31, and a resinous lens is used as for the projection lens 34. However, as for the light source 31, a laser light source or a lamp light source (e.g., an incandescent lamp, a halogen lamp, a discharge lamp, and a neon lamp) may be used. Also, as for the projection lens 34, a glass lens may be used.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system configured to control a light distribution of a lighting device mounted in a vehicle, the system comprising:
   a light source;
   a projection lens through which at least a part of light emitted from the light source passes;
   a rotary shade disposed at a rear side of the projection lens to block a part of the light emitted from the light source and having a rotary axis;
   a first driving mechanism configured to change a direction of an optical axis of the projection lens; and
   a second driving mechanism configured to rotate the rotary shade on the rotary axis,
   wherein the rotary shade includes: a first edge projected to a front area of the projection lens, as a periphery of a first light distribution pattern, when the second driving mechanism rotates the rotary shade to a first angle position; a second edge projected to the front area of the projection lens, as a first periphery of a second light distribution pattern, when the second driving mechanism rotates the rotary shade to a second angle position, the second light distribution pattern having an illumination area larger than an illumination area of the first light distribution pattern; and a twist end surface extending around the rotary axis to intersect the first edge at a first position with respect to a direction of the rotary axis, and to intersect the second edge at a second position with respect to a direction of the rotary axis,
   the twist end surface includes an edge projected to the front area of the projection lens, as a second periphery of the second light distribution pattern, and the system further comprises: a first information acquisition unit configured to acquire first information on a rudder angle of the vehicle; a second information acquisition unit configured to acquire second information on a front area of the vehicle; a first control unit configured to control the first driving mechanism to determine the direction of the optical axis based on the first information; and a second control unit configured to control the second driving mechanism to determine a position of the second periphery based on the second information.

2. The system of claim 1, wherein the second control unit controls the second driving mechanism to determine the position of the second periphery based on the second information, with respect to the direction of the optical axis determined by the first control unit.

3. The system of claim 2, wherein the rotary shade includes a peripheral surface extending concentrically around the rotary axis, and the first edge and the second edge constitute a part of the peripheral surface.

4. The system of claim 3, wherein the light source includes a first light source and a second light source,
   the projection lens includes a first projection lens and a second projection lens,
   the first projection lens is disposed such that the first light distribution pattern is formed by light emitted from the first light source,
   the second projection lens and the rotary shade are disposed such that a part of the second light distribution pattern including the second periphery is formed by light emitted from the second light source, and
   the first driving mechanism is configured to change a direction of an optical axis of at least the first projection lens.

5. The system of claim 4, wherein the first driving mechanism is configured to change the direction of the optical axis of the first projection lens and a direction of an optical axis of the second projection lens at once.

6. The system of claim 2, wherein the light source includes a first light source and a second light source,
   the projection lens includes a first projection lens and a second projection lens,
   the first projection lens is disposed such that the first light distribution pattern is formed by light emitted from the first light source,
   the second projection lens and the rotary shade are disposed such that a part of the second light distribution pattern including the second periphery is formed by light emitted from the second light source, and
   the first driving mechanism is configured to change a direction of an optical axis of at least the first projection lens.

7. The system of claim 6, wherein the first driving mechanism is configured to change the direction of the optical axis of the first projection lens and a direction of an optical axis of the second projection lens at once.

8. The system of claim 1, wherein the rotary shade includes a peripheral surface extending concentrically around the rotary axis, and the first edge and the second edge constitute a part of the peripheral surface.

9. The system of claim 8, wherein the light source includes a first light source and a second light source,
   the projection lens includes a first projection lens and a second projection lens,
   the first projection lens is disposed such that the first light distribution pattern is formed by light emitted from the first light source,
   the second projection lens and the rotary shade are disposed such that a part of the second light distribution pattern including the second periphery is formed by light emitted from the second light source, and
   the first driving mechanism is configured to change a direction of an optical axis of at least the first projection lens.

10. The system of claim 9, wherein the first driving mechanism is configured to change the direction of the optical axis of the first projection lens and a direction of an optical axis of the second projection lens at once.

11. The system of claim 1, wherein the light source includes a first light source and a second light source, the projection lens includes a first projection lens and a second projection lens, the first projection lens is disposed such that the first light distribution pattern is formed by light emitted from the first light source, the second projection lens and the rotary shade are disposed such that a part of the second light distribution pattern including the second periphery is formed by light emitted from the second light source, and the first driving mechanism is configured to change a direction of an optical axis of at least the first projection lens.

12. The system of claim 11, wherein the first driving mechanism is configured to change the direction of the optical axis of the first projection lens and a direction of an optical axis of the second projection lens at once.

* * * * *